United States Patent
Onishi et al.

(10) Patent No.: US 10,021,358 B2
(45) Date of Patent: Jul. 10, 2018

(54) IMAGING APPARATUS, IMAGING SYSTEM, AND SIGNAL PROCESSING METHOD

(71) Applicant: CANON KABUSHIKI KAISHA, Tokyo (JP)

(72) Inventors: Tomoya Onishi, Ayase (JP); Noriyuki Kaifu, Atsugi (JP); Fujio Kawano, Kawasaki (JP); Hisashi Takado, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/847,605

(22) Filed: Dec. 19, 2017

(65) Prior Publication Data

US 2018/0109769 A1 Apr. 19, 2018

Related U.S. Application Data

(63) Continuation of application No. 15/147,263, filed on May 5, 2016, now Pat. No. 9,883,152.

(30) Foreign Application Priority Data

May 11, 2015 (JP) .................................. 2015-096831

(51) Int. Cl.
*H04N 5/378* (2011.01)
*H04N 5/349* (2011.01)
(Continued)

(52) U.S. Cl.
CPC ........... *H04N 9/083* (2013.01); *G06T 3/4015* (2013.01); *H04N 5/349* (2013.01); *H04N 5/378* (2013.01);
(Continued)

(58) Field of Classification Search
CPC ........ H04N 5/378; H04N 5/349; H04N 9/045; H04N 9/083; H04N 2209/046; G06T 3/4015
(Continued)

(56) References Cited

U.S. PATENT DOCUMENTS 5,382,976 A 1/1995 Hibbard
8,314,863 B2 * 11/2012 Tachi ..................... H04N 5/217
348/234

(Continued)

FOREIGN PATENT DOCUMENTS

| EP | 1793620 A1 | 6/2007 |
| JP | 2014-072658 A | 4/2014 |
| WO | 2014/050249 A1 | 4/2014 |

OTHER PUBLICATIONS

Mrityunjay Kumar, Efrain O. Morales, James E. Adams Jr., Wei Hao; ICIP, pp. 2681-2684, 2009.

(Continued)

*Primary Examiner* — Tuan Ho
*Assistant Examiner* — Marly Camargo
(74) *Attorney, Agent, or Firm* — Canon U.S.A., Inc. IP Division

(57) ABSTRACT

A plurality of adjacent pixels is provided adjacently in a plurality of directions to a first pixel. A direction with a highest correlation is derived from signals of the plurality of pixels, and the direction with the highest correlation is reflected to interpolation processing to be performed on the signal of first pixel.

9 Claims, 13 Drawing Sheets

(51) Int. Cl.
*H04N 9/04* (2006.01)
*G06T 3/40* (2006.01)
*H04N 9/083* (2006.01)

(52) U.S. Cl.
CPC ....... *H04N 9/045* (2013.01); *H04N 2209/046* (2013.01)

(58) Field of Classification Search
USPC ....... 348/222.1, 216.1, 223.1, 273–283, 236, 348/238, 270, 271; 382/162, 165, 167, 382/278; 250/208.1; 356/310
See application file for complete search history.

(56) References Cited

U.S. PATENT DOCUMENTS

| | | | |
|---|---|---|---|
| 9,883,152 B2* | 1/2018 | Onishi | H04N 9/083 |
| 2007/0076269 A1* | 4/2007 | Kido | H04N 5/23245 |
| | | | 358/474 |
| 2013/0216130 A1 | 8/2013 | Saito | |
| 2015/0109496 A1* | 4/2015 | Hirota | H04N 9/045 |
| | | | 348/279 |
| 2015/0172615 A1* | 6/2015 | Tanaka | H04N 9/045 |
| | | | 348/242 |
| 2016/0080715 A1* | 3/2016 | Tanaka | H04N 5/3696 |
| | | | 348/223.1 |
| 2016/0284055 A1* | 9/2016 | Moriguchi | H04N 5/3696 |

OTHER PUBLICATIONS

Ed Chang, Shiufun Cheung and Davis Pan; SPIE, vol. 3650, pp. 36-43, Jan. 1999.
Jue Wang, Chao Zhang, Pengwei Hao; 2011 18th IEEE International Conference on Image Processing, pp. 3153-3156, 2011.

* cited by examiner

FIG. 2A

|  | X=1 | 2 | 3 | 4 | 5 | 6 | 7 | 8 |
|---|---|---|---|---|---|---|---|---|
| Y=1 | R | W | G | W | R | W | G | W |
| 2 | W | W | W | W | W | W | W | W |
| 3 | G | W | B | W | G | W | B | W |
| 4 | W | W | W | W | W | W | W | W |
| 5 | R | W | G | W | R | W | G | W |
| 6 | W | W | W | W | W | W | W | W |
| 7 | G | W | B | W | G | W | B | W |
| 8 | W | W | W | W | W | W | W | W |

FIG. 2B

|  | X=1 | 2 | 3 | 4 | 5 |
|---|---|---|---|---|---|
| Y=1 | R | W | G | W | R |
| 2 | W | W⇔W⇔W | | | W |
| 3 | G | W | B | W | G |
| 4 | W | W⇔W⇔W | | | W |
| 5 | R | W | G | W | R |

FIG. 2C

|  | X=1 | 2 | 3 | 4 | 5 |
|---|---|---|---|---|---|
| Y=1 | R | W | G | W | R |
| 2 | W | W | W | W | W |
| 3 | G | W | B | W | G |
| 4 | W | W | W | W | W |
| 5 | R | W | G | W | R |

FIG. 2D

|  | X=1 | 2 | 3 | 4 | 5 |
|---|---|---|---|---|---|
| Y=1 | R | W | G | W | R |
| 2 | W | W | W | W | W |
| 3 | G | W | B | W | G |
| 4 | W | W | W | W | W |
| 5 | R | W | G | W | R |

FIG. 2E

|  | X=1 | 2 | 3 | 4 | 5 |
|---|---|---|---|---|---|
| Y=1 | R | W | G | W | R |
| 2 | W | W | W | W | W |
| 3 | G | W | B | W | G |
| 4 | W | W | W | W | W |
| 5 | R | W | G | W | R |

FIG. 4A
FIG. 4C
FIG. 4B
FIG. 4D
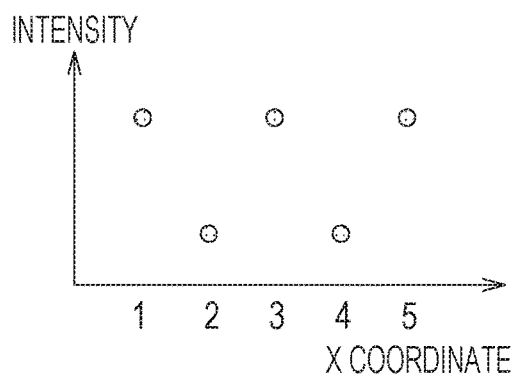
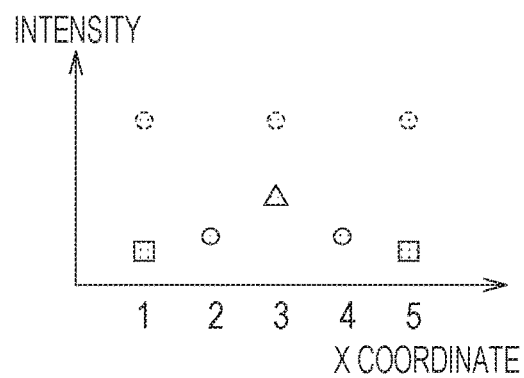
○ INTENSITY AT W PIXEL
◉ INTERPOLATED W-VALUE AS A RESULT OF HIGH PRECISION INTERPOLATION
△ INTENSITY AT B PIXEL
□ INTENSITY AT G PIXEL

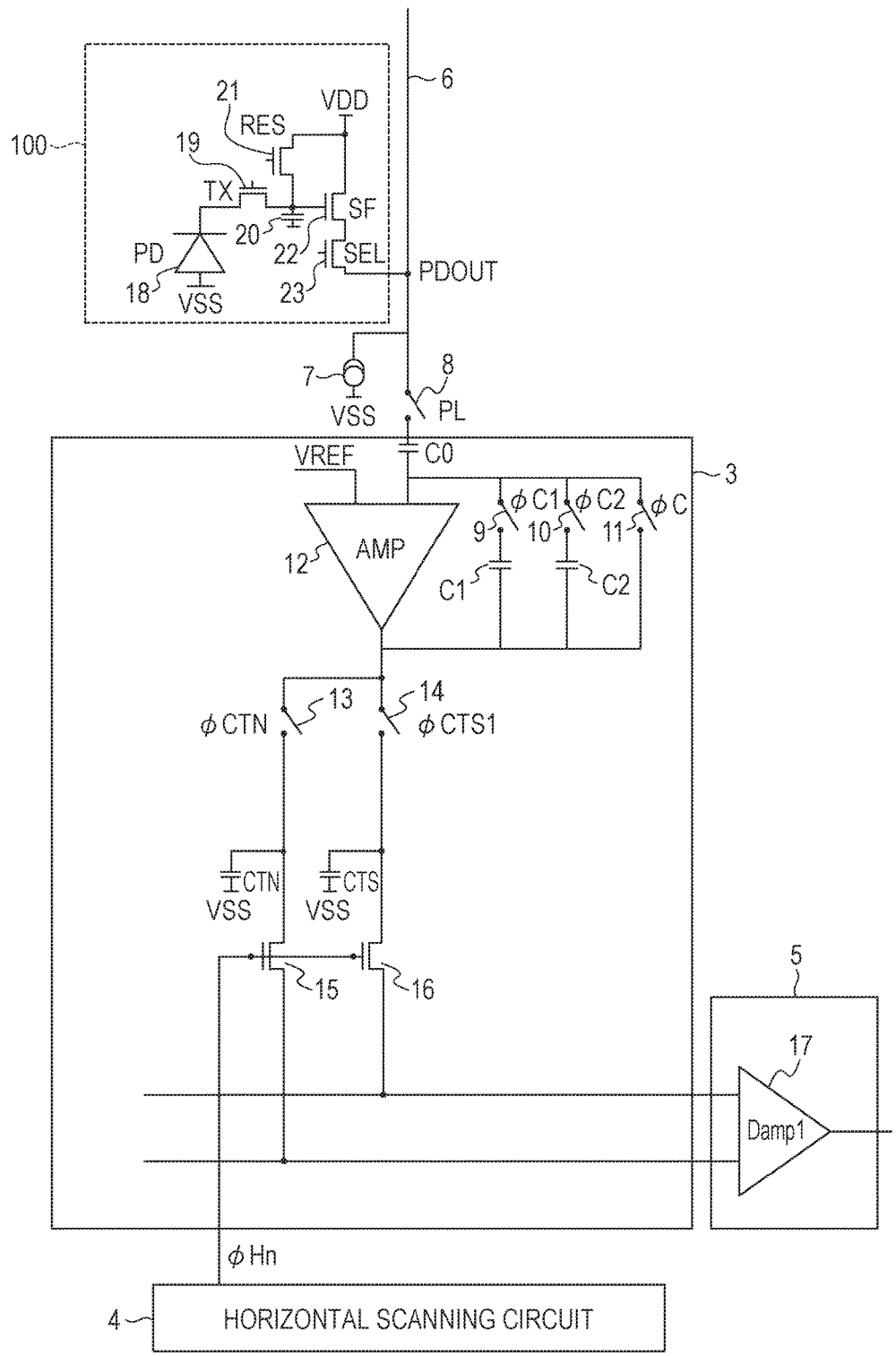

FIG. 7A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 7B

| R | W | G | W | R | W | G | W |
|---|---|---|---|---|---|---|---|
| W | W | W | W | W | W | W | W |
| G | W | B | W | G | W | B | W |
| W | W | W | W | W | W | W | W |
| R | W | G | W | R | W | G | W |
| W | W | W | W | W | W | W | W |
| G | W | B | W | G | W | B | W |
| W | W | W | W | W | W | W | W |

FIG. 7C

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 7D

| R | G | B | G | R | G | B | G |
|---|---|---|---|---|---|---|---|
| G | G | G | G | G | G | G | G |
| B | G | R | G | B | G | R | G |
| G | G | G | G | G | G | G | G |
| R | G | B | G | R | G | B | G |
| G | G | G | G | G | G | G | G |
| B | G | R | G | B | G | R | G |
| G | G | G | G | G | G | G | G |

FIG. 8A

| M | Y | M | Y | M | Y | M | Y |
|---|---|---|---|---|---|---|---|
| Y | C | Y | C | Y | C | Y | C |
| M | Y | M | Y | M | Y | M | Y |
| Y | C | Y | C | Y | C | Y | C |
| M | Y | M | Y | M | Y | M | Y |
| Y | C | Y | C | Y | C | Y | C |
| M | Y | M | Y | M | Y | M | Y |
| Y | C | Y | C | Y | C | Y | C |

FIG. 8B

| M | W | Y | W | M | W | Y | W |
|---|---|---|---|---|---|---|---|
| W | W | W | W | W | W | W | W |
| Y | W | C | W | Y | W | C | W |
| W | W | W | W | W | W | W | W |
| M | W | Y | W | M | W | Y | W |
| W | W | W | W | W | W | W | W |
| Y | W | C | W | Y | W | C | W |
| W | W | W | W | W | W | W | W |

FIG. 8C

| W | M | W | Y | W | M | W | Y |
|---|---|---|---|---|---|---|---|
| C | W | Y | W | C | W | Y | W |
| W | Y | W | M | W | Y | W | M |
| Y | W | C | W | Y | W | C | W |
| W | M | W | Y | W | M | W | Y |
| C | W | Y | W | C | W | Y | W |
| W | Y | W | M | W | Y | W | M |
| Y | W | C | W | Y | W | C | W |

FIG. 8D

| M | Y | C | Y | M | Y | C | Y |
|---|---|---|---|---|---|---|---|
| Y | Y | Y | Y | Y | Y | Y | Y |
| C | Y | M | Y | C | Y | M | Y |
| Y | Y | Y | Y | Y | Y | Y | Y |
| M | Y | C | Y | M | Y | C | Y |
| Y | Y | Y | Y | Y | Y | Y | Y |
| C | Y | M | Y | C | Y | M | Y |
| Y | Y | Y | Y | Y | Y | Y | Y |

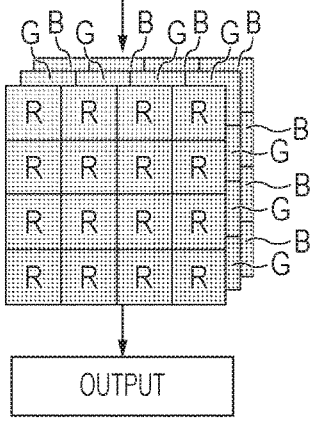

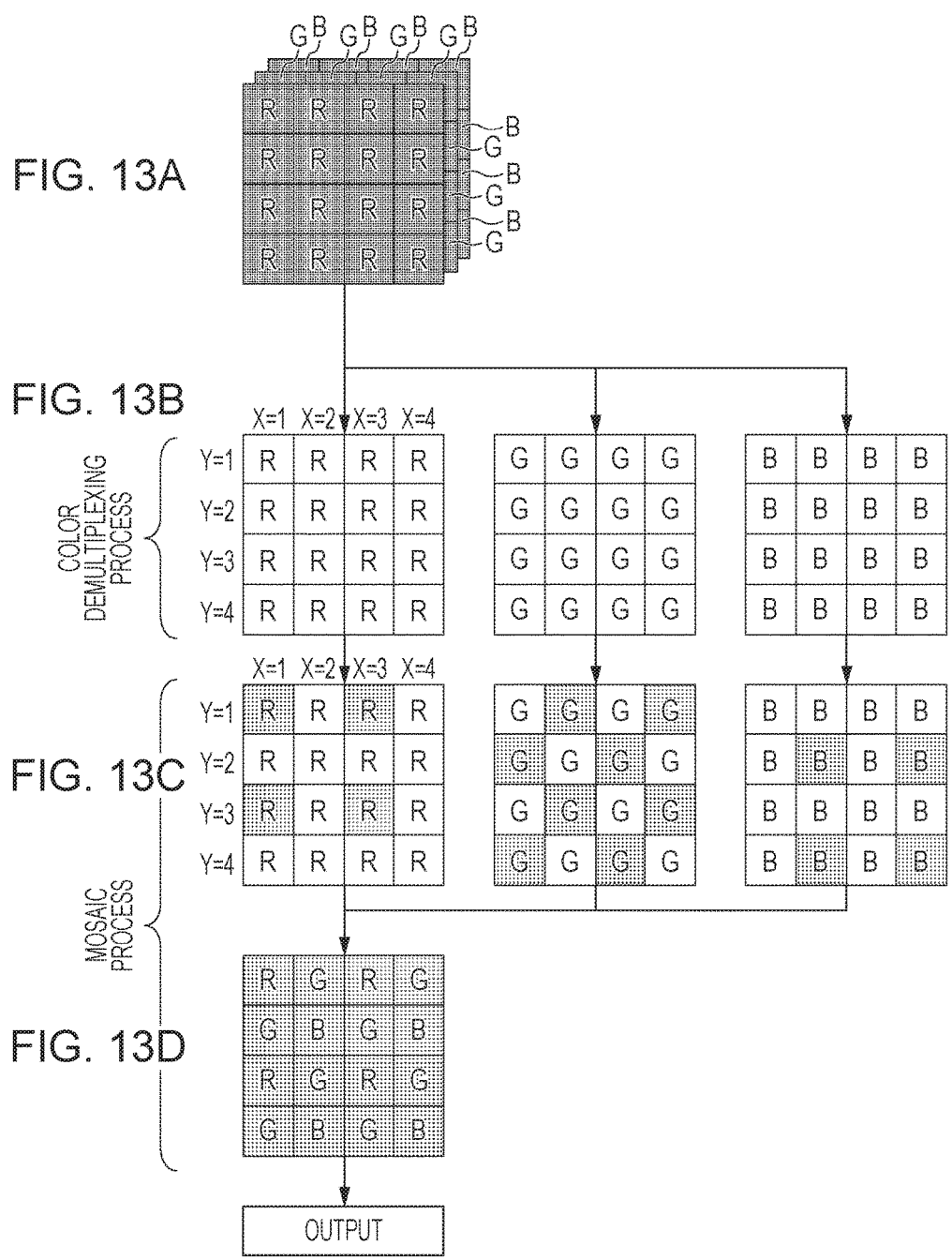

IMAGING APPARATUS, IMAGING SYSTEM, AND SIGNAL PROCESSING METHOD

CROSS-REFERENCE TO RELATED APPLICATION

This application is a Continuation of U.S. application Ser. No. 15/147,263, filed May 5, 2016, which claims priority from Japanese Patent Application No. 2015-096831 filed May 11, 2015, which are hereby incorporated by reference herein in their entireties.

BACKGROUND OF THE INVENTION

Field of the Invention

The present invention relates to an imaging apparatus, an imaging system, and a signal processing method.

Background

An image pickup element has pixels on its element surface, and each of the pixels has a color filter (hereinafter, called a CF) allowing a specific wavelength component such as light of colors red, green, and blue to pass through. Hereinafter, red, green, and blue will be called R, G, and B, respectively. A pixel having a CF for R, a pixel having a CF for G, and a pixel having a CF for B will be called, a red pixel, a green pixel, and a blue pixel, respectively, hereinafter. The red pixel, green pixel, and blue pixel will collectively be called RGB pixels.

For improved sensitivity of image pickup elements, configurations for increasing the proportion of pixels allowing easy acquisition of information regarding brightness have been proposed. Among such pixels, use of a white pixel (hereinafter, called a W pixel) which widely transmits light of a visible light region can improve the sensitivity so that an image having a high S/N ratio can be acquired.

Japanese Patent Laid-Open No. 2014-072658 discloses that interpolation processing is performed on an output signal from an image pickup element having an RGBW pattern including RGB pixels and a W pixel.

According to Japanese Patent Laid-Open No. 2014-072658, pixels in neighborhood of a pixel of interest are used to obtain correlations in a plurality of directions. It is disclosed therein that the correlations in different directions are used as a criterion for determining an interpolation method for the pixel of interest. Japanese Patent Laid-Open No. 2014-072658 further discloses that pixel data of pixels of one color having a pixel of a different color therebetween or pixel data of adjacent pixels of different colors are used.

SUMMARY OF THE INVENTION

An aspect of the present invention provides an imaging apparatus including a first pixel, a second pixel, a third pixel, a fourth pixel, a fifth pixel, a sixth pixel, and a seventh pixel, each of the pixels having a photoelectric converting unit, and a signal processing unit, wherein a wavelength band range of light to be photoelectrically converted by the photoelectric converting unit of the first pixel is a first wavelength band range, a wavelength band range of light to be photoelectrically converted by the photoelectric converting unit of each of the second to seventh pixels is a second wavelength band range including the first wavelength band range and being wider than the first wavelength band range, the second to seventh pixels are adjacent to the first pixel, the first pixel is present between the second pixel and the third pixel in a first direction, the first pixel is present between the fourth pixel and the fifth pixel in a second direction different from the first direction, the first pixel is present between the sixth pixel and the seventh pixel in a third direction different from the first and second directions, the fourth pixel and the seventh pixel are provided adjacently along a direction parallel with the first direction, the second pixel and the sixth pixel are provided adjacently along a direction parallel with the second direction, the signal processing unit acquires a first correlation value being a correlation value in the first direction from signals of the fourth pixel and the seventh pixel and acquires a second correlation value being a correlation value in the second direction from signals of the second pixel and the sixth pixel, the signal processing unit acquires one with higher correlation between the first direction and the second direction by comparing the first correlation value and the second correlation value, and the signal processing unit further interpolates a signal corresponding to the second wavelength band range of the first pixel by using signals of two pixels provided along the direction with higher correlation among the second to seventh pixels.

Another aspect of the present invention provides a signal processing method for processing signals output from a first pixel, a second pixel, a third pixel, a fourth pixel, a fifth pixel, a sixth pixel, and a seventh pixel, each of the pixels having a photoelectric converting unit, in which a wavelength band range of light to be photoelectrically converted by the photoelectric converting unit of the first pixel is a first wavelength band range, a wavelength band range of light to be photoelectrically converted by the photoelectric converting unit of each of the second to seventh pixels is a second wavelength band range including the first wavelength band range and being wider than the first wavelength band range, the second to seventh pixels are adjacent to the first pixel, the first pixel is present between the second pixel and the third pixel in a first direction, the first pixel is present between the fourth pixel and the fifth pixel in a second direction different from the first direction, the first pixel is present between the sixth pixel and the seventh pixel in a third direction different from the first and second directions, the fourth pixel and the seventh pixel are provided adjacently along a direction parallel with the first direction, the second pixel and the sixth pixel are provided adjacently along a direction parallel with the second direction, the signal processing method including acquiring a first correlation value being a correlation value in the first direction from signals of the fourth pixel and the seventh pixel and acquires a second correlation value being a correlation value in the second direction from signals of the second pixel and the sixth pixel, acquiring one with higher correlation between the first direction and the second direction by comparing the first correlation value and the second correlation value, and interpolates a signal corresponding to the second wavelength band range of the first pixel by using signals of two pixels provided along the direction with higher correlation among the second to seventh pixels.

Further features of the present invention will become apparent from the following description of exemplary embodiments with reference to the attached drawings.

BRIEF DESCRIPTION OF THE DRAWINGS

FIGS. 2A to 2E illustrate exemplary CF patterns in an image pickup element and signal processing therein.

FIGS. 3A to 3E illustrate an exemplary light exposure pattern in an image pickup element, signal processing therein, a CF pattern in an image pickup element according to a variation example, and signal processing according to the variation example.

FIGS. 4A to 4D illustrate an example of a light exposure pattern in an image pickup element and pixel data.

FIG. 6 illustrates an exemplary configuration of an image pickup element.

FIGS. 7A to 7D illustrate exemplary CF patterns of an image pickup element.

FIGS. 8A to 8D illustrate exemplary CF patterns of an image pickup element.

FIGS. 9A to 9E illustrate signal processing in an imaging apparatus.

FIGS. 11A to 11E illustrate signal processing in an imaging apparatus.

FIGS. 13A to 13D illustrate an exemplary signal processing in an imaging apparatus.

DESCRIPTION OF THE EMBODIMENTS

The technology disclosed in Japanese Patent Laid-Open No. 2014-072658 uses pixel data of pixels of one color having a pixel of a different color therebetween as pixel data of pixels of one color to be used for interpolation processing. This may lower the precision of interpolation due to use of pixel data of far pixels of one color. On the other hand, when pixel data of adjacent pixels are used for interpolation processing, the pixel data are of pixels of different colors, which may also lower precision of interpolation.

The following exemplary embodiments relate to a technology for performing interpolation processing using pixel data of adjacent pixels.

Exemplary embodiments will be described with reference to drawings.

Figure 1:
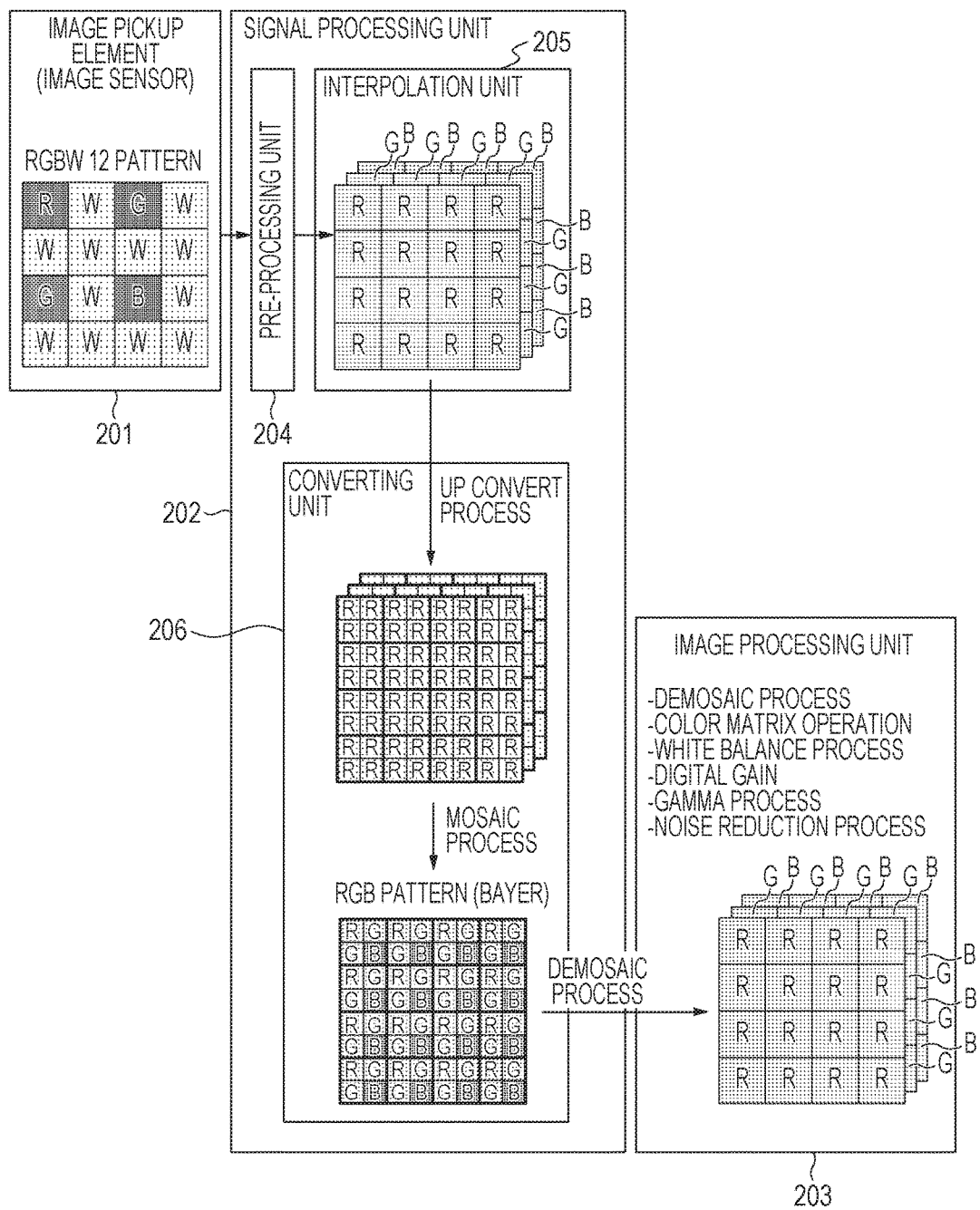
FIG. 1 illustrates signal processing in an imaging apparatus.

FIG. 1 illustrates a configuration of an imaging apparatus, an image processing unit 203 provided externally to the imaging apparatus, and signal processing to be performed by the imaging apparatus. The imaging apparatus has an image pickup element 201, and a signal processing unit 202. The signal processing unit 202 has a pre-processing unit 204, an interpolating unit 205, and a converting unit 206. The signal processing unit 202 generates data acquired by performing interpolation processing and an up conversion process on an output signal output from the image pickup element 201. The signal processing unit 202 further performs a mosaic process which generates a mosaic image on the data and outputs the resulting data to the image processing unit 203. Predetermined data to be input to the image processing unit 203 have a Bayer pattern in this embodiment. FIG. 1 also illustrates data sets to be generated by the interpolating unit 205, the converting unit 206, and the image processing unit 203. FIG. 1 illustrates data sets generated as a result of the processes performed by those component units. For example, the data set illustrated along with the image processing unit 203 is generated as a result of a demosaic process performed by the image processing unit 203 on the data output from the converting unit 206.

The image pickup element 201 may be a CMOS image sensor or a CCD image sensor, for example. According to this embodiment, a CMOS image sensor is used.

The image pickup element 201 according to this embodiment has a plurality of pixels. Each of the plurality of pixels has a light transmission unit. Partial pixels of the plurality of pixels have color filters (CF) each of which allows light having a wavelength corresponding to one of red (R), green (G), and blue (B) colors to pass through. The color filters are examples of the light transmission unit. Each of the plurality of pixels has a photoelectric converting unit which generates an electric carrier based on incident light. A pixel provided for generating an electric carrier based on incident light will be called an effective pixel, hereinafter. The number of effective pixels provided in the image pickup element 201 is equal to 1920 pixels in a horizontal direction and 1080 pixels in a vertical direction.

FIG. 1 illustrates pixels R, G, B, and W in the image pickup element 201. The letters "R", "G", "B", and "W" given to the pixels in FIG. 1 indicate colors corresponding to wavelengths of light passing through the light transmission units in the pixels. The letters "R", "G", "B", and "W" indicate red, green, blue, and white, respectively. The light transmission unit in a W pixel may be a resin which does not have a member configured to narrow the wavelength band range of light passing therethrough. In other words, a W pixel does not have a CF. Therefore, the wavelength band range of light to be received by the photoelectric converting unit in a W pixel is wider than the wavelength band range of light to be received by photoelectric converting units in RGB pixels.

The image pickup element 201 according to this embodiment has a CF pattern called an RGBW12 pattern. An arrangement pattern of light transmission units in a plurality of pixels will be called a CF pattern though each W pixel does not have a CF. In this pattern, pixels are arranged based on a ratio of numbers of R:G:B:W=1:2:1:12 among 4×4 or 16 pixels. In the RGBW12 pattern, color pixels including red pixels, green pixels, and blue pixels are adjacent to a W pixel in a vertical direction, a horizontal direction, and a diagonal direction in planar view. In other words, color pixels being a first pixel are adjacent to a W pixel in an upward direction, a downward direction, a right direction, a left direction, an upper right diagonal direction, a lower left diagonal direction, an upper left diagonal direction, and a lower right diagonal direction as seen in a planar view. A first direction refers to a direction viewed from a W pixel adjacent to the first pixel in the upper direction to the first pixel in planar view. A second direction refers to a direction viewed from a W pixel adjacent to the first pixel in the left direction in planar view to the first pixel. A third direction refers to a direction viewed from a W pixel adjacent to the first pixel in the upper right diagonal direction in planar view to the first pixel. A fourth direction refers to a direction viewed from a W pixel adjacent to the first pixel in the upper left diagonal direction in planar view to the first pixel. In other words, the color pixel being the first pixel is surrounded by the plurality of W pixels. More specifically, a pixel A of the plurality of W pixels is a pixel adjacent to the first pixel in the upper direction in planar view. A pixel B of the plurality of W pixels is a pixel adjacent to the first pixel in the downward direction in planar view. The direction from the pixel A to the pixel B corresponds to the first direction. In the first direction, the first pixel positions between the pixel A and the pixel B. A pixel C of the plurality of W pixels is a pixel adjacent to the first pixel in the left direction in planar view. A pixel D of the plurality of W pixels is a pixel adjacent to the first pixel in the right direction in planar view. The direction from the pixel C to the pixel D corresponds to the second direction. In the second direction, the first pixel positions between the pixel C and the pixel D. A pixel E of the plurality of W pixels is a pixel adjacent to the first pixel in the upper right diagonal direction in planar view. A pixel F of the plurality of W pixels is a pixel adjacent to the first pixel in the lower left diagonal direction in the planar view. The direction from the pixel E to the pixel F corresponds to the third direction. In the third direction, the first pixel positions between the pixel E and the pixel F. A pixel G of the plurality of W pixels is a pixel adjacent to the first pixel in the upper left diagonal direction in planar view. A pixel H of the plurality of W pixels is a pixel adjacent to the first pixel in the lower right diagonal direction in planar view. The direction from the pixel G to the pixel H corresponds to the fourth direction. In the fourth direction, the first pixel positions between the pixel G and the pixel H. The pixel C and the pixel F are adjacent in the direction parallel to the first direction. The pixel A and the pixel E are adjacent in the direction parallel to the second direction. The pixels A to H will be called second to ninth pixels, respectively.

The RGBW12 pattern has a ratio of W pixels equal to ¾ of the total number of pixels. The image pickup element 201 may have a pixel from which an image is not directly output, such as an optical black pixel, and a dummy pixel, in addition to effective pixels. Each of the W pixels does not have a CF. Thus, the wavelength band range to which the W pixels are sensitive may include all wavelength band ranges to which the red pixels, green pixels, and blue pixels are sensitive. Therefore, W pixels have a wider spectral response than that of RGB pixels and have higher sensitivity than those of RGB pixels.

Use of the RGBW12 pattern may improve the precision of interpolation because a color pixel is surrounded by W pixels.

The signal processing unit 202 performs signal processing on an output signal from the image pickup element 201. The signal processing unit 202 has the pre-processing unit 204, the interpolating unit 205, and the converting unit 206.

An output signal from the image pickup element 201 is input to the pre-processing unit 204 in the signal processing unit 202. The pre-processing unit 204 may perform a correction process such as an offset correction and a gain correction on a signal.

The interpolating unit 205 performs interpolation processing on data output from the pre-processing unit 204. The interpolating unit 205 performs a demosaic process. The demosaic process according to this embodiment is performed based on a bilinear method for obtaining R data, G data, and B data from signals output from RGB pixels. The demosaic process according to this embodiment for R data interpolates with an R component being a value estimated as being obtained when a red pixel positions at a position where a W pixel actually positions. In the same manner, the demosaic process of this embodiment interpolates with a B component and a G component, like the R component, to generate B data and G data, respectively.

The RGBW12 pattern has more W pixels per unit area from which resolution information can be obtained, compared with a case where W pixels are arranged in a checkered pattern. Thus, resolution information with a higher spatial frequency (or at finer pitches) can be obtained, compared with a case where W pixels are arranged in a checkered pattern. In other words, the signal processing unit 202 can use output signals output from the image pickup element 201 in the RGBW12 pattern to generate data with a higher sense of resolution than an output signal from an image pickup element in which W pixels are arranged in a checkered pattern.

The converting unit 206 performs an up conversion process and a mosaic process by using data output from the interpolating unit 205. The up conversion process is a resolution increasing process which generates data of a second resolution higher than a first resolution from data of the first resolution. According to this embodiment, an output signal from the image pickup element 201 has a resolution of 1920×1080 pixels, that is, so-called 2K1K resolution. Based on 2K1K input data, the signal processing unit 202 outputs data of 3840×2160 pixels, that is, so-called 4K2K resolution as a result of the up conversion process. In other words, the converting unit 206 according to this embodiment uses one pixel signal output from the interpolating unit 205 to perform processing for generating four pixel signals.

The up conversion process may be performed by using a nearest neighbor interpolation, a bilinear method, or a bicubic method, for example. The converting unit 206 of this embodiment performs a mosaic process, which will be described below, after the up conversion process. In this case, a nearest neighbor interpolation may be used to prevent accumulation of data processing errors.

The converting unit 206 of this embodiment performs a mosaic process. The mosaic process to be performed by the converting unit 206 of this embodiment is a process for generating Bayer data by using color data of R data, G data, and B data. The Bayer data refer to data obtained when RGB pixels are arranged in a Bayer pattern in a single image sensor.

The image processing unit 203 generates a photographed image by using data output from the signal processing unit 202. The image processing unit 203 may perform a demosaic process, a color matrix operation, a white balance process, a digital gain, a gamma process, a noise reduction process, or the like as required. Among these processes, the demosaic process is more greatly associated with the resolution information of the photographed image than the other processes. According to this embodiment, the converting unit 206 performs the mosaic process after performing the up conversion process. Thus, by using one R signal of 2×2 data (one R signal, two G signals, and one B signal) output from the converting unit 206, the image processing unit 203 generates one R signal of R data. The image processing unit 203 can generate signals for G data and B data of other colors by performing the same process as the process for generating R data.

The interpolating unit 205 interpolates signals from the pre-processing unit 204. The RGBW12 pattern having more W pixels for obtaining resolution information advantageously provides that data at a resolution with a high spatial frequency (or at fine pitches) can be obtained, compared with W pixels arranged in a checkered pattern.

By using such adjacent W pixels, correlations (directivities) in the vertical direction, the horizontal direction and diagonal direction in planar view can be obtained for each pixel. The term "correlation (directivity)" here refers to a difference between signals of a plurality of pixels. The correlation may be a slope acquired by dividing the difference by a distance between centers of gravity of pixels. Examples of the correlation (directivity) may include a result of determination of whether an edge of a photographic subject exists or not or whether an isolated point exists or not. A case where the correlation is acquired by using a difference between signals of a plurality of pixels will be described below.

For example, in order to interpolate a red pixel with a value corresponding to another color (such as W), the interpolation value may be calculated with reference to data in a direction with higher correlation (or a small difference). Thus, the value of W at the red pixel can be interpolated with higher precision compared with a case where the interpolation value is calculated with reference to data in a direction with low correlation (or a large difference). The directivity calculation process may further include a process for acquiring a distribution. Calculation and interpolation of a correlation value in each direction for deriving correlation will be described in detail below.

FIGS. 2A to 2E illustrate a method for detecting correlations (directivities) between the RGBW12 pattern and a blue pixel. FIG. 2A specifies addresses for pixels. A pixel here is represented by a CF color (X coordinate value, Y coordinate value). For example, a pixel positioned at X=3, and Y=3 is represented by B(3, 3). A method for acquiring a correlation (directivity) by using an extracted 5 pixel×5 pixel region about B(3, 3) will be described. The correlation values are calculated based upon directivity.

FIG. 2B illustrates arrows indicating pixels to be used for calculation of correlation values in the horizontal direction.

Correlation Value (horizontal) =

$|W(2, 2) - W(3, 2)| \times 2 + |W(3, 2) - W(4, 2)| \times 2 +$ $|W(2, 4) - W(3, 4)| \times 2 + |W(3, 4) - W(4, 4)| \times 2$ FIG. 2C illustrates arrows indicating pixels to be used for calculation of correlation values in the vertical direction.

Correlation Value (vertical) =

$|W(2, 2) - W(2, 3)| \times 2 + |W(2, 3) - W(2, 4)| \times 2 +$ $|W(4, 2) - W(4, 3)| \times 2 + |W(4, 3) - W(4, 4)| \times 2$ FIG. 2D illustrates arrows indicating pixels to be used for calculation of correlation values in the left diagonal direction. Each of differences is weighted with its corresponding distance, and a sum total of absolute values of the differences is acquired as the correlation value (left diagonal).

Correlation Value (left diagonal) =

$|W(1, 2) - W(2, 3)| + |W(2, 3) - W(3, 4)| \times 2 + |W(3, 4) - W(4, 5)| +$ $|W(2, 1) - W(3, 2)| + |W(3, 2) - W(4, 3)| \times 2 + |W(4, 3) - W(5, 4)|$ FIG. 2E illustrates arrows indicating pixels to be used for calculation of correlation values in the right diagonal direction. Each of differences is weighted with its corresponding distance, and a sum total of absolute values of the differences is acquired as the correlation value (right diagonal).

Correlation Value (right diagonal) =

$|W(1, 4) - W(2, 3)| + |W(2, 3) - W(3, 2)| \times 2 + |W(3, 2) - W(4, 1)| +$ $|W(2, 5) - W(3, 4)| + (W(3, 4) - W(4, 3)| \times 2 + |W(4, 3) - W(5, 2)|$ When the four correlation values are acquired, the sum of the coefficients of the terms of the differences is equal to 8. The coefficients are given for the purpose of reduction of the distance for weighting about the position where the differences are calculated and for the purpose of equalization of weights given to the four correlation values. The positions (indicated by arrows) where differences are calculated are arranged linear symmetrically about B(3, 3). This is for improving the symmetrical property for acquiring the correlation values so as to reduce errors relating to correlation values. In order to acquire a correlation value in a diagonal direction, a difference between pixels in proximity of a pixel of interest is multiplied by 2, and a difference between pixels farther from the pixel of interest than the pixels in proximity is one time. Weighting the difference based on a distance from a pixel of interest as described above can increase the precision of the calculated correlation value.

The direction having the smallest value of the four acquired correlation value (horizontal), correlation value (vertical), correlation value (left diagonal), and correlation value (right diagonal) can have a small difference, that is, high correlation.

Figures 3A, 3B, 3C, 3D, 3E:
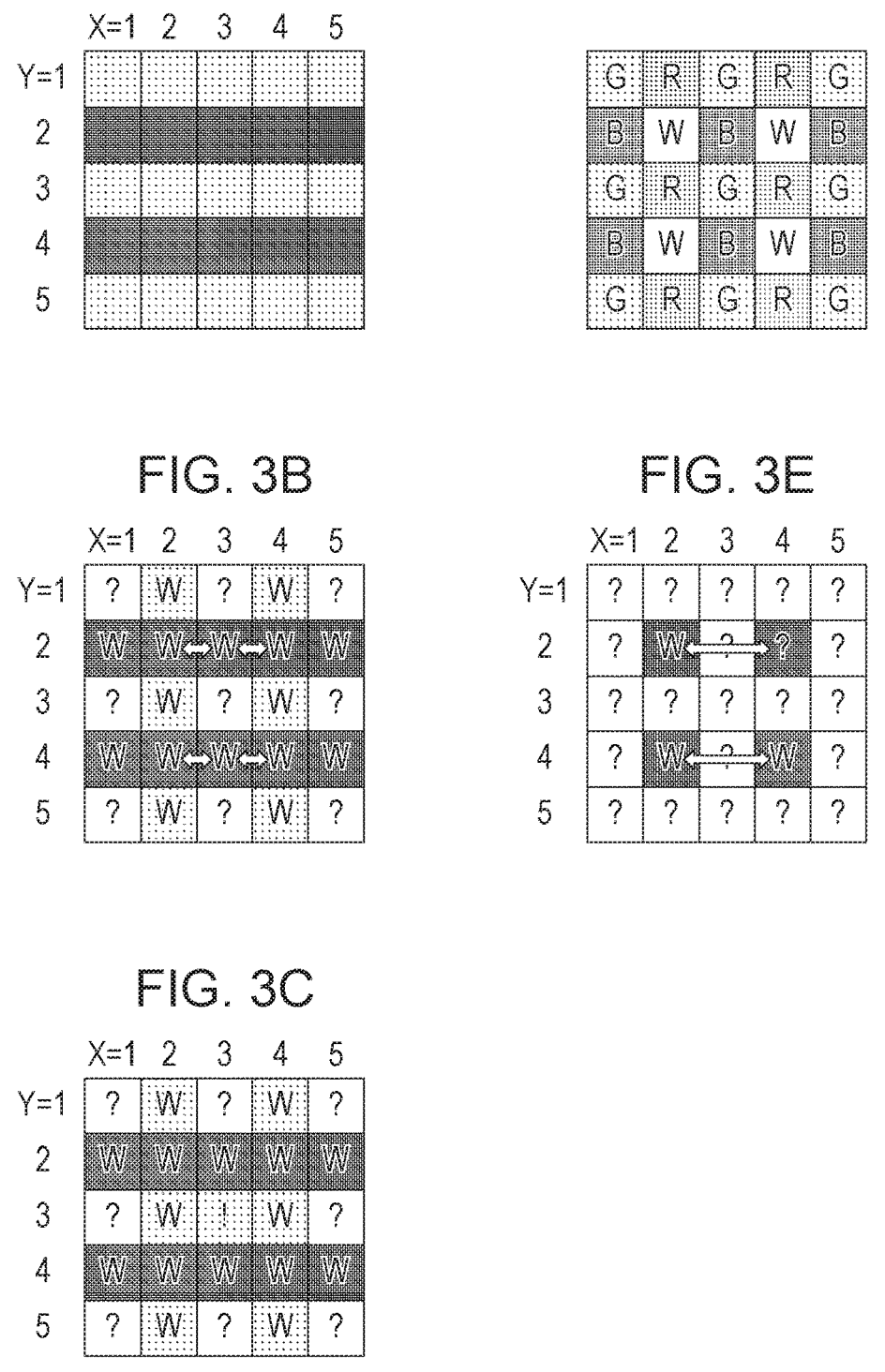

FIG. 3A illustrates a light exposure pattern of an image sensor in a case where an image having a small correlation value (horizontal) is generated. More specifically, FIG. 3A schematically illustrates signal intensity of data corresponding to pixels in a case where a line extending in a horizontal direction is exposed by an image sensor.

FIG. 3B illustrates signal intensity in a case where the image in FIG. 3A is captured by using an RGBW12 pattern. The "?" in FIG. 3B indicates a pixel (R, G, B) of a color excluding W, and a pixel indicated by W is a W pixel. The shading of the W pixels in FIG. 3B indicates signal intensity of data. The pixels indicated by "?" are pixels excluding W pixels.

Acquiring correlation for pixels indicated by "?" at coordinates (3, 3) in FIG. 3B, the correlation increases in the direction that the difference decreases. The thin lines in the horizontal direction in FIG. 3B have a smallest correlation value (horizontal). Referring to FIG. 3C, because of the presence of the correlation in the horizontal direction, the interpolation value for the coordinates (3, 3) may be acquired by averaging the data of W(2, 3) and W(4, 3). The interpolating unit 205 having the signal processing unit 202 as described above compares correlation values in different directions of W pixels in vicinity of the pixel of interest (3, 3) and acquires a direction with a small difference as a result of the comparison. The interpolating unit 205 then uses the interpolation direction acquired as a result of the comparison to estimate and interpolate W data of the pixel of interest (3, 3) from the W pixels adjacent to the pixel of interest (3, 3). Performing an interpolation in this way can lead interpolation processing based on information regarding a difference between pixels and can improve the resolution. The interpolation for the pixel is indicated by "!" at coordinates (3, 3) in FIG. 3C.

A case will be described in which the thin lines in the horizontal direction as illustrated in FIG. 3A in the RGBW pixel pattern as illustrated in the FIG. 3D are exposed by the image sensor on the other hand. In this case, acquiring correlation values also involves acquiring correlation values by using signals between W pixels positioned with a pixel of another color therebetween as illustrated in FIG. 3E. As illustrated in FIG. 3E, among the correlation values acquired by using signals of W pixels having a pixel of another color therebetween, the following correlation values in the horizontal direction and the vertical direction may not be equal.

Correlation Value (horizontal)=|W(2, 2)−W(4, 2)|+|W(2, 4)−W(4, 4)|

Correlation Value (depth)=|W(2, 2)−W(2, 4)|+|W(4, 2)−W(4, 4)|

Because the thin line with pixels having an equal correlation value cannot be identified as a vertical line or a horizontal line, an interpolation error may occur. In other words, a pattern of a photographic subject with a small sampling period for W pixels is difficult to detect.

Acquiring an interpolation value by using the thus calculated correlation value as described above can increase the precision of the interpolation processing. A correlation value can be acquired by using information regarding a photographic subject, such as edge information and shape information of a photographic subject to acquire the directivity with higher precision. In this case, a sharper image (or an image with higher resolution) can be acquired in this case, compared with a case where interpolation processing is performed by using a correlation value acquired without using information regarding a photographic subject.

By performing the interpolation processing as described above, the interpolation values for other colors (such as G, B, and W) can be obtained with high precision for a pixel of one color (such as a red pixel). In other words, occurrence of the false color can be reduced. In order to reduce occurrence of false color, a characteristic that a local color change is strongly correlated with a change in brightness is used to acquire a RGB data ratio and a W data ratio of a plurality of pixel data, and the ratios are multiplied by W data. The interpolation is performed with color data equivalent to the resolution of W pixels. The interpolation processing will be described with reference to FIGS. 4A to 4D.

FIG. 4A illustrates signal intensity in a case where green-blue lines extending in a vertical direction are exposed to an image sensor. The green-blue lines with high luminance are exposed to the pixels of columns corresponding to X=1, 3, and 5, and green-blue lines with low brightness are exposed to pixels of columns corresponding to X=2, 4, and 6. (Note that the column corresponding to X=6 is not shown in FIG. 4A).

FIG. 4B is a graph illustrating the intensity distribution in FIG. 4A against coordinates in an X direction. Because the brightness and darkness of the green-blue lines are repeated alternately, the pattern of the repetition of the brightness and darkness is exposed to W pixels and is converted to data. A case will be described in which the line pattern is exposed with an RGBW12 pattern illustrated in FIG. 4C. FIG. 4D illustrates an intensity distribution against coordinates in the X directions in a part corresponding to Y coordinate=3 in FIG. 4C. FIG. 4D plots intensities of W pixels at W(2, 3) and W(4, 3) as indicated by solid line circles, as in explanatory notes. FIG. 4D illustrates broken line circles indicating intensity predicted values of interpolated W at coordinates (1, 3), (3, 3), and (5, 3) and exhibiting iWg(1, 3), iWb(3, 3), and iWg(5, 3). These values are inferred as data equivalent to W(3, 2) and W(3, 4) because the pattern has vertical thin lines. FIG. 4D further illustrates triangles indicating the intensity of a blue pixel at B(3, 3). Because the sensitivity of a W pixel is higher than that of the blue pixel, the interpolation value iW(3, 3) for the W pixel at the X coordinate=3 is higher than the value B(3, 3) of the blue pixel.

Acquiring the ratio of colors from the data of the interpolated iWb 3, 3) and B(3, 3), a change in blue color in the neighborhood can be expressed by multiplying the color ratio B(3, 3)/iWb(3, 3) by data of W. The color ratio can correct the false color by using iWb(3, 3) with high precision.

The false color correction can be acquired by performing the following calculations. A local color ratio is a ratio of iW and RGB in other words, and the ratio can be expressed as follows:

$$\text{RGB\_ratio} = \left[ \frac{R}{iWr} \quad \frac{Gr+Gb}{iWgr+iWgb} \quad \frac{B}{iWb} \right] \quad (1)$$

In this case, iWr is a iWr interpolation value for a red pixel, iWgr is a W interpolation value for Gr pixel, iWgb is a W interpolation value for a Gb, and iWb is a W interpolation value for a blue pixel. When the values of iWr, iWgr, iWgb, and iWb largely differ, one color of RGB may sometimes be emphasized. Against it, an expression standardized with a sum of color ratios of RGB can be used.

$$\text{RGB\_ratio} = \qquad (2)$$

$$\left[ \frac{R}{\frac{R}{iWr} + \frac{Gr+Gb}{iWgr+iWgb} + \frac{B}{iWb}} \quad \frac{\frac{Gr+Gb}{2}}{\frac{R}{iWr} + \frac{Gr+Gb}{iWgr+iWgb} + \frac{B}{iWb}} \quad \frac{B}{\frac{R}{iWr} + \frac{Gr+Gb}{iWgr+iWgb} + \frac{B}{iWb}} \right]$$

The thus acquired color ratio RGB_ratio and data of W or interpolation value iWr*iWgr*iWgb*iWb may be used to acquire RGB values of each pixel as follows:

$$RGB=[R\_ratio \cdot W \; G\_ratio \cdot W \; B\_ratio \cdot W] \quad (3)$$

In this case, $$RGB\_ratio=[R\_ratio \; G\_ratio \; B\_ratio] \quad (4)$$

Thus, an RGB image having undergone the interpolation and the false color correction can be formed from RGBW12 data.

The converting unit 206 performs up conversion and remosaic processes by using a signal from the interpolating unit 205. The up conversion process is a type of resolution conversion and collectively refers to generating an image with a higher resolution than an original resolution.

The image processing unit 203 is a part which uses an output from the signal processing unit 202 to generate an output image and may also be called a RGB signal processing unit because it may generate an RGB image. The image processing unit 203 converts an output from a sensor to a color image by performing a demosaic process, a color matrix operation, a white balance process, a digital gain, a gamma process, a noise reduction process, and the like as required. Among these processes, the demosaic part is particularly important to resolution information, and advanced interpolation processing can be performed by assuming CFs in a Bayer pattern from it.

Manufacturing a new dedicated image processing unit for an image pickup element having a special CF pattern may result in increases of costs and time. Therefore, use of an image processing unit configured to process a general Bayer pattern may be highly advantageous. Thus, performing the remosaic process as described above enables use of the special CF pattern at low cost.

For the reason described above, in a case where an image pickup element capable of a large amount of resolution information regarding a RGBW12 pattern is used, correlation values in a pattern having a spatial frequency smaller than two pixels are acquired. This can reduce interpolation error with use of a pattern (of thin lines, for example) having a spatial frequency smaller than two pixels, improve the resolution, and reduce occurrence of false color.

First Exemplary Embodiment

An imaging apparatus according to a first exemplary embodiment will be described with reference to drawings. The following descriptions may refer to the imaging apparatus in FIG. 1 as required.

Figure 5:
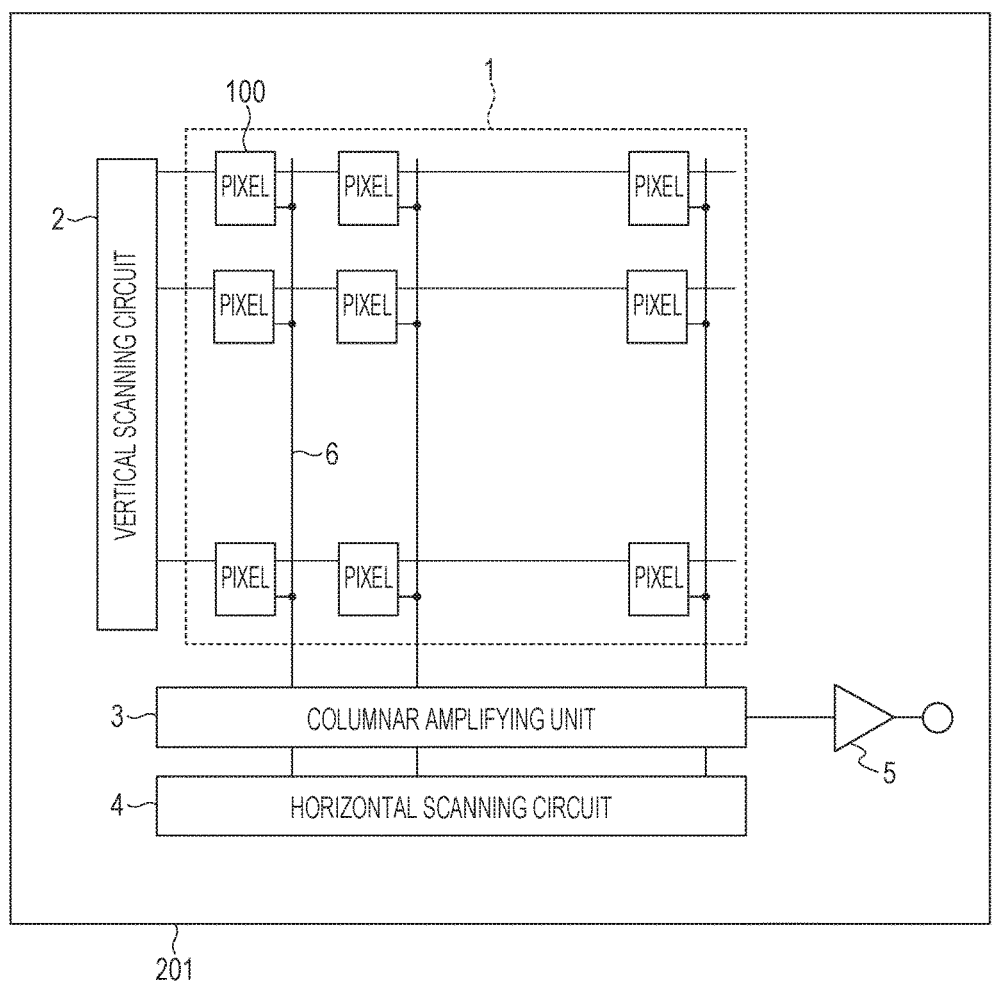
FIG. 5 illustrates an exemplary configuration of an image pickup element.

FIG. 5 illustrates an example of an image pickup element 201 according to this exemplary embodiment. An image pickup element 201 according to this exemplary embodiment has an image sensing region 1 having a pixel array having pixels 100 arranged in a matrix form, a vertical scanning circuit 2, a columnar amplifying unit 3, a horizontal scanning circuit 4, and an output unit 5. The vertical scanning circuit 2 supplies a control signal for controlling an ON state (conductive state) and an OFF state (non-conductive state) of transistors in the pixels 100 to the transistors of the pixels 100. The image sensing region 1 has a vertical signal line 6 for reading out signals from the pixels 100 column by column. The horizontal scanning circuit 4 has a switch for the columnar amplifying unit 3 for the columns and a horizontal scanning circuit 4 configured to supply a control signal for controlling the switch to an ON state or an OFF state. As a result of scanning performed by the horizontal scanning circuit 4, signals are sequentially output from columns associated with the columnar amplifying unit 3 to the output unit 5. The signals output from the columnar amplifying unit 3 to the output unit 5 are input to a signal processing unit 202 external to the image pickup element 201, as illustrated in FIG. 1.

Having described that output signals output from the image pickup element 201 are analog signals, for example, the image pickup element 201 may output digital signals. In that case, an analog-digital conversion process to be performed by the signal processing unit 202 may be omitted.

The imaging apparatus in FIG. 5 will be described with reference to FIG. 6. The vertical scanning circuit 2 controls signal levels of a signal PTX, a signal PRES, and a signal PSEL to be supplied to the pixels 100 to perform vertical scanning which is scanning pixels 100 in the image sensing region 1 row by row. As a result of the vertical scanning performed by the vertical scanning circuit 2, each of the pixels 100 outputs a photoelectric conversion signal to a vertical signal line 6 through a PDOUT terminal. A current source 7 supplies electric current to the pixels 100 through the vertical signal line 6. A switch 8 controls an input to the columnar amplifying unit 3.

The columnar amplifying unit 3 has a capacitance C0, a capacitance C1, a capacitance C2, a switch 9, a switch 10, a switch 11, and an amplifying circuit 12 for determining the amplification efficiency of the columnar amplifying unit 3. The columnar amplifying unit 3 has a switch 13, a switch 14, a storage capacitor CTN, and a storage capacitor CTS for sample holding and a switch 15, and a switch 16 for connecting to a horizontal transfer signal line.

The horizontal scanning circuit 4 sequentially controls conductive states and non-conductive states of the switch 15 and the switch 16 for columns for which the amplifying circuit 12 is provided. Thus, the horizontal scanning circuit 4 performs horizontal scanning which is scanning column by column to be performed by the columnar amplifying unit 3.

When the horizontal scanning circuit 4 turns the switch 15 and the switch 16 to a conductive state, signals held in a capacitative element CTN and a capacitative element CTS are input to an output amplifier. An output amplifier 17 outputs signals acquired by amplifying input signals externally to the image pickup element.

With reference to FIG. 6, details of the image pickup element 201 will further be described. Each of the pixels 100 has a photodiode 18, a transistor 19, a floating diffusion capacitance 20, a transistor 21, a transistor 22, and a transistor 23.

A photodiode (hereinafter, sometimes called a PD) 18 is a photoelectric converting unit configured to accumulate electric carriers based on incident light.

The transistor 19 has one terminal connected to the photodiode 18 and the other terminal connected to the floating diffusion capacitance 20. The floating diffusion capacitance (sometimes called an FD) 20 is a structure also functioning as a drain terminal of the transistor 19 and is capable of holding electric carriers transferred (sometimes called a TX) from the photodiode 18 through the transistor 19. The electric carriers accumulated in the photodiode 18 are transferred when a signal PTX input from the vertical scanning circuit 2 to a gate terminal of the transistor 19 is changed to a High level (sometimes called an H level).

When the signal PRES input from the vertical scanning circuit 2 is changed to an H level, the transistor 21 resets (sometimes called RES) the potential of the floating diffusion capacitance 20 to a potential based on power supply voltage VDD.

The transistor 22 has an input node electrically connected to the floating diffusion capacitance 20. The transistor 22 has one main node receiving supply of bias electric current from the current source 7 connected through the vertical signal line 6 and the other main node receiving supply of power supply voltage VDD so that a source follower (sometimes called an SF).

When a signal PSEL input from the vertical scanning circuit 2 is changed to an H level, the transistor 23 outputs a signal output from the transistor 22 to the vertical signal line 6. The transistor 23 outputs a signal to the vertical signal line 6 at a node PDOUT. A signal output from the transistor 22 is based on electric carriers held in the floating diffusion capacitance 20.

Next, operations to be performed by the columnar amplifying unit 3 will be described.

The switch 8 controls so as to input a signal output from the corresponding pixel 100 to the amplifying circuit 12.

The capacitance C0, the capacitance C1, and the capacitance C2 are capacitances usable for amplification to be performed by the amplifying circuit 12. The switch 9, and the switch 10 are controlled such that input voltage can be amplified in accordance with a capacitance ratio of C0/C1, C0/C2, or C0/(C1+C2).

The switch 11 is usable for controlling the resets of the capacitance C1 and the capacitance C2.

The switch 13 and the switch 14 are controlled such that a signal output from the amplifying circuit 12 can be sample-held in the capacitances CTN and CTS. The switch 13 is turned on so that an output signal (sometimes called an N signal) when the floating diffusion capacitance 20 has a reset level among signals output from the pixel 100 can be sample held in the capacitance CTN. The switch 14 is turned so that an output signal (sometimes called an S signal) when electric carriers are transferred to the floating diffusion capacitance 20 among output signals from the pixel 100 can be sample held in the capacitance CTS.

The switch 15 and the switch 16 are controlled such that a signal φHn from the horizontal scanning circuit 4 can be changed to an H level and outputs of the sample-held capacitance CTN and capacitance CTS are sequentially connected to the output amplifier 17.

The image pickup element as described above may be used so that an optical signal input to the image pickup element can be read out as an electric signal.

FIGS. 7A to 7D illustrate examples of a CF pattern using RGB pixels as color pixels. FIG. 7A illustrates a Bayer pattern having a CF ratio of R:G:B equal to 1:2:1. More green pixels are provided than pixels of other colors because visual properties of a human being is highly sensitive to the G wavelength, and more green pixels can give a sense of resolution. In the Bayer pattern, a green pixel is adjacent to a red pixel or a blue pixel in an upper direction, a downward direction, a right direction, and a left direction in planar view. On the other hand, a green pixel is adjacent to another green pixel in upper right diagonal, lower right diagonal, upper left diagonal, and lower left diagonal directions in planar view. A red pixel is adjacent to a blue pixel in upper right diagonal, lower right diagonal, upper left diagonal, and lower left diagonal directions in planar view. For the interpolation of a G component in the red pixel or blue pixel in this case, pixel data between green pixels having a pixel of another color therebetween is used for calculating the correlation values for the upward, downward, right and left directions. Alternatively, pixel data of adjacent pixels of different colors may be used. This may reduce the precision of calculation of the correlation values, and false color may easily occur.

FIG. 7C illustrates an RGBW8 pattern. In this pattern, RGB pixels are arranged adjacently to a W pixel in upward, downward, right and left directions in planar view. On the other hand, the RGB pixels are arranged adjacently to pixels of different colors from a W pixel in upper right diagonal, lower right diagonal, upper left diagonal, and lower left diagonal directions in planar view. Also in this pattern, the precision of calculation of correlation values can be reduced, and false color may easily occur, like the Bayer pattern in FIG. 7A as described above.

FIG. 7B illustrates a RGBW12 pattern. In this pattern, CFs are arranged at a ratio of R:G:B:W=1:2:1:12 in a 4×4 pixel array. The pattern includes a characteristic that all of RGB pixels being color pixels are surrounded by W pixels. The term "surrounded" refers to a W pixel is disposed in all directions of upward, downward, right and left, upper right diagonal, lower right diagonal, upper left diagonal, lower left diagonal directions about a pixel of interest in planar view. In this pattern, the proportion of W pixels is equal to ¾ of all effective pixels. From the characteristic that color pixels are surrounded by W pixels, correlation values in the horizontal direction, the vertical direction, the right diagonal direction, and the left diagonal direction can be acquired properly, as described regarding the interpolation processing according to this embodiment. Thus, interpolation processing with high precision can be achieved by using an image pickup element having the RGBW12 pattern. The RGBW12 pattern has more W pixels than those of the Bayer pattern and the RGBW8 pattern, which can provide an effect for improving the sensitivity of the image pickup element 201.

FIG. 7D illustrates a CF pattern called an RGBG12. In the pattern, the W pixels in the RGBW12 are replaced by G pixels, and CFs are arranged at a ratio of R:G:B=2:12:2 in a 4×4 pixel array. This pattern is defined such that a red pixel and a blue pixel are surrounded by green pixels, and the proportion of the green pixels is equal to ¾ of all of the pixels. Each of red pixels and blue pixels is adjacent to a green pixel in the upward, downward, right, left, upper right diagonal, lower right diagonal, upper left diagonal, and lower left diagonal directions. In other words, each of red pixels and blue pixels is surrounded by green pixels. Thus, correlation values in the vertical, horizontal, right diagonal, and left diagonal directions can be acquired by using pixel data of two or more adjacent green pixels, like the case with the RGBW12 pattern in FIG. 7B as described above. Therefore, interpolation processing with high precision can be achieved by using an image pickup element having the RGBG12 pattern. A brightness value at a high resolution can be obtained at all pixel positions where the value of a green pixel is equal to the value of brightness. The proportion of green pixel with higher sensitivity to red pixels and blue pixels is higher, which can improve sensitivity of the RGBG pattern more than the Bayer pattern.

FIGS. 8A to 8D illustrate examples of pixel patterns where CFs of complementary colors of C (cyan), M (magenta), and Y (yellow). FIG. 8A illustrates a Bayer pattern having a CF ratio of C:M:Y=1:1:2. FIG. 8B illustrates a CMYW12 pattern. In this pattern, CFs of 4×4 pixels are arranged at a ratio of C:M:Y:W=1:1:2:12. FIG. 8C illustrates a CMYW8 pattern. In this pattern, CFs are arranged at a ratio of C:M:Y:W=2:2:4:8 in a 4×4 pixel array. FIG. 8D illustrates a CMYY12 pattern. Also in a CF pattern of those complementary colors where a pixel which outputs color data is surrounded by pixels which output resolution data, the interpolation processing of this embodiment can be performed properly, as in the cases illustrated in FIGS. 7A to 7D. In other words, the interpolation processing of this embodiment can be performed properly in the patterns illustrated in FIGS. 8B and 8D.

As described above, the CFs can be arranged in various patterns. In order to generate an image at a higher resolution by using a single image sensor, more pixels which generate resolution data (green pixels in a Bayer pattern, and W pixels in an image pickup element having W pixels) may be provided. Green pixels which generate resolution data may be arranged in a checkered pattern as a Bayer pattern, which may cause an interpolation error. According to the present invention, more pixels which generate resolution data are provided than those in the checkered pattern, from which occurrence of smaller interpolation error has been found. Therefore, the effect of the present invention may be exhibited significantly by using an image pickup element having a CF pattern such as the RGBW12 in FIG. 7B, the RGBG12 in FIG. 7D, the CMYW12 in FIG. 8B, and the CMYY12 in FIG. 8D among the CF patterns as described above. This is because brightness pixels which can generate brightness are provided in eight directions, instead of four directions, at pixel positions necessary for interpolation with high precision in the RGBW12 in FIG. 7B, the RGBG12 in FIG. 7D, the CMYW12 in FIG. 8B, and the CMYY12 in FIG. 8D. In this case, four correlation values (horizontal), (depth), (left diagonal), and (right diagonal) can be acquired as described above. By comparing these correlation values, information regarding differences in the four directions can be obtained. Based on the information regarding the differences, the interpolating unit 205 can perform interpolation with high precision. Thus, the interpolating unit 205 can obtain a brightness value at the color pixel position with high precision. As described above, from a geometrical point of view, a plurality of brightness pixels which generate brightness arranged at four sides of a color pixel which generates color and a plurality of brightness pixels which share four apexes of the color pixel are arranged. Thus, brightness information at the color pixel position can be obtained through interpolation with high precision.

According to this exemplary embodiment, each of the pixels is rectangular, and brightness pixels which generate brightness are adjacent to each of the pixels in eight directions of upward, downward, right, left, upper right diagonal, lower right diagonal, upper left diagonal, and lower left diagonal directions. The present invention is not limited thereto but may be applied to a case where each of the pixels may be hexagonal brightness pixels are arranged adjacently to six sides of the hexagon. Also in this case, correlation values in four directions of vertical direction, horizontal direction, right diagonal direction, and left diagonal directions may be acquired by using pixel data of adjacent two pixels of an identical color, and the correlation values may be compared to obtain information regarding differences between them. Thus, the interpolation processing according to this embodiment can be performed properly.

FIGS. 9A to 9E illustrate processes to be performed by the interpolating unit 205 illustrated in FIG. 1. It should be noted that FIGS. 9A to 9E illustrate a case where the image pickup element 201 has an RGBW12 pattern as a CF pattern.

FIG. 9A illustrates data to be input from the pre-processing unit 204. The pre-processing unit 204 may perform a correction process such as an offset (OFFSET) correction and a gain (GAIN) correction on an input signal Din as required to generate an output Dout having undergone the correction process. The process may typically be expressed by the following expression (5).

$$D\text{out} = (D\text{in} - \text{OFFSET}) \cdot \text{GAIN} \tag{5}$$

This correction may be performed in various units. For example, the correction may be performed on each pixel, each columnar amplifier, each analog-digital converting unit (ADC), or each output amplifier. Performing the correction may reduce so-called fixed pattern noise and can provide a higher quality image.

The interpolating unit 205 performs a "data demultiplexing" process which demultiplexes data output from the pre-processing unit 204 into W data and color data (of a G signal, an R signal, and a B signal).

The signal of a pixel of RGB pixels in 4×4 pixels from which W data are obtained is not known (indicated by "?" in drawings) as illustrated in FIG. 9B. The color data have a low resolution (spatially coarse) because they are obtained from 2×2 pixels of 4×4 pixels, as illustrated in FIG. 9D.

Next, the interpolating unit 205 performs a process for interpolating the signal indicated by "?" by using surrounding signals. The interpolation process may be performed based on any of various methods. The methods may include a method (bilinear method) which averages signals of upper, lower and right and left four pixels to average signals of surrounding eight pixels, a method which detects edges of surrounding pixels and performs an interpolation process perpendicularly to the edge directions, and a method which detects a pattern of thin lines, for example, and performs an interpolation process in the direction of the pattern. The interpolation process may be performed based on the following method.

For convenience of description of the interpolation method, FIG. 9C also illustrates X coordinates and Y coordinates. For example, a signal iWb is a signal having coordinates (3, 3) in W data and is therefore indicated as iWb(3, 3). Because iWb is unknown when the signal is input, an interpolation is necessary. For example, for interpolating iWb(3, 3) with an average of signals of surrounding eight pixels, iWb(3, 3) can be acquired by Expression (6) below.

$$iWb_{(3,3)} = \frac{W_{(2,2)} + W_{(3,2)} + W_{(4,2)} + W_{(2,3)} + W_{(4,3)} + W_{(2,4)} + W_{(3,4)} + W_{(4,4)}}{8} \tag{6}$$

According to this exemplary embodiment, a signal of a pixel having an unknown signal value is interpolated with signal values of surrounding pixels. A 4×4 pixel array is illustrated but iWr and iWg can be interpolated with information regarding surrounding eight pixels because the same pattern as illustrated is repeated.

Next, the interpolating unit 205 generates color data of R data, G data, and B data by using the interpolated W data as well as extracted color data. Colors to be used for generating R data, G data, and B data may be calculated based on various methods. As an example, color data may be standardized to acquire a ratio of colors. According to this method, a ratio of colors can be calculated by the following expression (7).

$$\text{RGB\_ratio} = \left[ \frac{R}{R+G+B} \quad \frac{G}{R+G+B} \quad \frac{B}{R+G+B} \right] \tag{7}$$

In this case, $$G = \frac{Gr + Gb}{2} \tag{8}$$

A ratio of color data to interpolated iWr, iWg, and iWb may be acquired instead. In this case, the ratio of the colors may be calculated by the following expression (9).

$$\text{RGB\_ratio} = \left[ \frac{R}{iWr} \quad \frac{Gr + Gb}{iWgr + iWgb} \quad \frac{B}{iWb} \right] \tag{9}$$

According to this exemplary embodiment, the method for acquiring the ratio of color data and interpolated iWr*iWgr*iWgb*iWb is applied.

The thus acquired RGB_ratio being the ratio of colors and a W signal or a signal of the interpolation value iWr*iWgr*iWgb*iWb may be used to acquire signal values corresponding to colors of R, G, and B at the pixels as in Expression (10).

$$\text{RGB} = [R\_\text{ratio} \cdot W \quad G\_\text{ratio} \cdot W \quad B\_\text{ratio} \cdot W] \tag{10}$$

In this case, the relationship $$\text{RGB\_ratio} = [R\_\text{ratio} \quad G\_\text{ratio} \quad B\_\text{ratio}] \tag{11}$$

is satisfied, and the calculated color data are also used.

Through this processing performed by the interpolating unit 205, R data, G data, and B data each having a resolution of 4×4=16 pixels can be obtained. The R data, G data, and B data generated by the interpolating unit 205 are first data generated by synthesizing resolution data and color data.

Next, with reference to FIGS. 10A to 10E, processing to be performed by the converting unit 206 will be described.

FIGS. 10A to 10E illustrate signal processing including performing an up conversion process and a mosaic process on color data and outputting Bayer data.

Figure 10A:
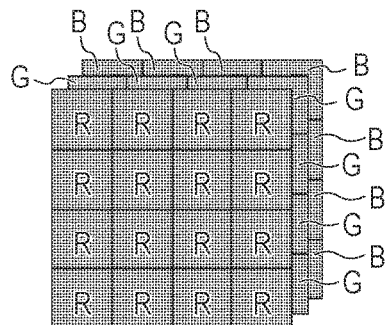
FIGS. 10A to 10E illustrate signal processing in an imaging apparatus.
Figure 10B:
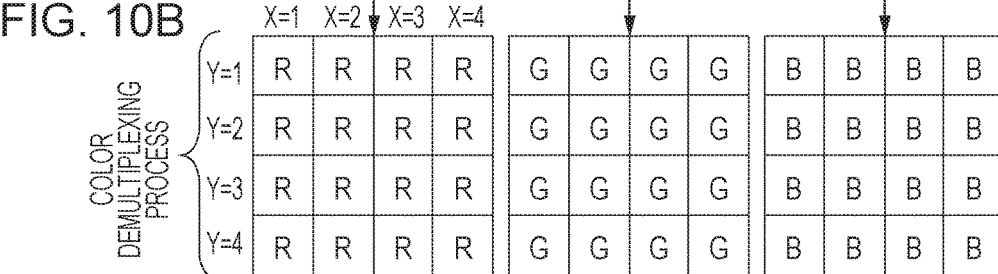

FIG. 10A illustrates data input from the interpolating unit 205. First, the data are demultiplexed into R data, G data, and B data as illustrated in FIG. 10B.

Figure 10C:
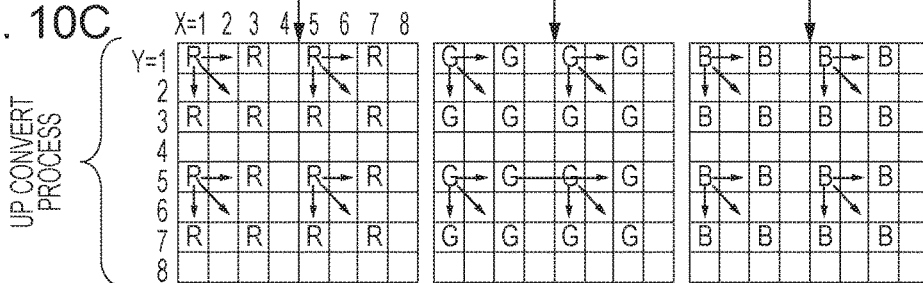

The color-demultiplexed color data undergo an up conversion process to have double resolutions in a vertical direction and a horizontal direction. For convenience of description of the up conversion method, FIG. 10B, FIG. 10C, and FIG. 10D also illustrate X coordinates and Y coordinates. For example, an upper left pixel with R is indicated by R(1, 1) because it generates R data at coordinates (1, 1). R(1, 1) in FIG. 10C is directly associated with the pixel at R(1, 1) in FIG. 10B. All of the pixels (1, 2), (2, 1), and (2, 2) in FIG. 10C have unknown signal values. According to this exemplary embodiment, nearest neighbor interpolation is used for interpolating an unknown signal value. The method assumes that the signal values of (2, 1), (1, 2), and (2, 2) in FIG. 10C are equal to the value of R(1, 1).

Figure 10D:
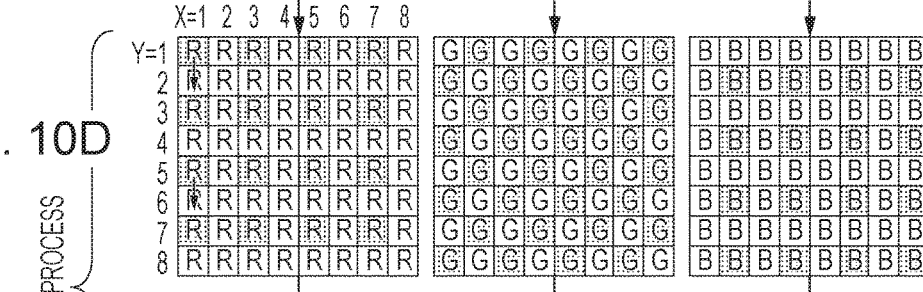

Thus, as illustrated in FIG. 10D, R data, G data, and B data having resolutions improved twice in the vertical direction and the horizontal direction are generated. The data acquired by the up conversion process are second data acquired by performing the up conversion process on the first data generated by the interpolating unit 205.

Next, in order to perform a mosaic process, shaded pixels in FIG. 10D are extracted. For R data in FIG. 10D, a signal having a lowest X coordinate value and a lowest Y coordinate value among signals of each array of 2×2 pixels is used. That is, signals at R(1, 1), R(3, 1), R(5, 1), R(7, 1), R(3, 1) and so on are used. For G data, data in a checkered pattern are extracted, like data in a Bayer pattern. For B data, a signal having a lowest X coordinate value and a lowest Y coordinate value among signals of each array of 2×2 pixels is used. That is, signals at B(2, 2), B(4, 2), B(6, 2), B(8, 1), B(4, 2)and so on are used.

Figure 10E:
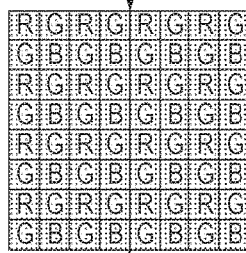

Thus, the converting unit 206 acquires mosaic data illustrated in FIG. 10E. The converting unit 206 outputs the mosaic data to the image processing unit 203. The mosaic data are data to be used for generating an image by the image processing unit 203. According to this exemplary embodiment, the data to be input to the image processing unit 203 are arranged in a Bayer pattern.

The image processing unit 203 performs the operations described with reference to FIG. 1. Thus, the image processing unit 203 generates a photographed image of a photographic subject.

An evaluation photographing has been performed by using an imaging apparatus configured to perform the processing as described above. In order to evaluate a sense of resolution, a TV resolution has been evaluated by using a resolution chart. As another example, mosaic data are generated by causing the converting unit 206 to perform the processing in FIGS. 10A to 10E except for the up conversion process, as illustrated in FIGS. 13A to 13D. As a comparison example, the mosaic data are used to generate a photographed image by the image processing unit 203.

From the comparison based on the method as described above, it has been found that the photographed image acquired by performing the processing as illustrated in FIGS. 10A to 10E according to this exemplary embodiment have 1000 TV horizontal resolutions. On the other hand, the photographed image according to the other example has 900 TV horizontal resolutions. Therefore, the image acquired by performing the up conversion process and thus generating mosaic data can have a better resolution.

The number of pixel signals may be equal to the number of pixels of the image pickup element 201 or may be equal to pixels in a limited region for outputting signals in the image pickup element 201 (which may be called partial readout or crop) or may be equal to the sum of signals added within the image pickup element 201 (which may be called binning). Thus, a pixel signals less than the number of pixels of the image pickup element 201 may be output. The effect of the processing according to this exemplary embodiment can be achieved by performing the up conversion process on output pixel signals and not depend on the total number of pixels of the image pickup element 201.

Each of the signal processing unit 202 and the image processing unit 203 in this exemplary embodiment may be an integrated circuit mounted on a semiconductor substrate.

The imaging apparatus of this exemplary embodiment may apply a stacked sensor in which a semiconductor substrate having the signal processing unit 202 thereon and a semiconductor substrate having the image pickup element 201 thereon are stacked.

According to this exemplary embodiment, the image processing unit 203 is provided externally to the imaging apparatus. As another example, the imaging apparatus may contain the image processing unit 203.

It has been described that, according to this exemplary embodiment, data having undergone the remosaic process are output to the image processing unit 203 to form an image. This exemplary embodiment is not limited thereto, but RGB data may be output from the signal processing unit 202 to an image processing unit, or video data may be output directly from the signal processing unit 202.

Evaluation photographing was performed by using the imaging apparatus having performed the processing above. The subject image was evaluated based on a TV resolution for acquiring the sense of resolution.

In the comparison examples in FIGS. 3D and 3E, the TV resolution is acquired by using pixel data of pixels of a first color having a pixel of a second color therebetween for detection of the directivity. Thus, the precision of the directivity calculation is lower than that of this exemplary embodiment. Because no column or row having adjacent pixels of the first color exists in the comparison examples, the precision of detection of a linear photographic subject is lower than that of this exemplary embodiment. From this, the precision of detection of the directivity in the linear photographic subject in the comparison example is lower than that of this exemplary embodiment.

As a result of the comparison based on the method described above, the output data of this embodiment has 1000 TV horizontal resolutions. On the other hand, the output data of the comparison example has 900 TV horizontal resolutions.

The signal processing of this embodiment may be performed by the image processing unit 203 configured to process an output signal output from the image pickup element 201 having RGB pixels in a Bayer pattern, instead of the image pickup element 201 having W pixels as in this embodiment. Therefore, the signal processing of this embodiment can reduce costs for designing the image processing unit 203 specially for the image pickup element 201 having W pixels. In other words, the signal processing of this embodiment can suppress the compatibility between the imaging apparatus and the image processing unit 203. Therefore, the signal processing of this embodiment can generate a photographed image having reduced color noise while suppressing the compatibility between the imaging apparatus and the image processing unit 203.

The signal processing unit 202 and the image processing unit 203 according to this embodiment may be implemented by hardware such as a computer caused to execute a software program corresponding to the signal processing method. The signal processing method executed by the signal processing unit 202 and the image processing unit 203 of this embodiment may be programmed in software to be distributed in a recording medium such as a CD-ROM and a DVD-ROM or through communication.

The W data and color data illustrated in FIGS. 9B and 9D may be acquired by averaging W data and color data of a plurality of frames output from the image pickup element 201. Alternatively, W data of N frames (where N is a number equal to or higher than 1) may be averaged, and color data of M frames more than N frames may be averaged. In this case, an image having reduced color noise may be generated while suppressing the reduction of the sense of resolution may be suppressed. In a case where it is detected that a moving object is included in a photographic subject, W data of one frame and color data of a plurality of frames may be used to generate the image, without averaging W data. In this case, an image having reduced color noise can be obtained while preventing fluctuations of the photographic subject. In a case where it is detected that a moving object is not included in a photographic subject, the image processing unit 203 may average W data and color data of every plurality of frames to generate an image. On the other hand, in a case where it is detected that a moving object is included in a photographic subject, the image processing unit 203 may generate an image from W data and color data of every frame.

Second Exemplary Embodiment

An imaging apparatus according to a second exemplary embodiment will be described mainly with respect to differences from the first exemplary embodiment.

The imaging apparatus of this exemplary embodiment acquires correlation values by weighting based on distances between pixels to calculate the correlation values.

Pixels of the image pickup element 201 of this exemplary embodiment are arranged in a two-dimensional grid pattern being substantially square. Therefore, with respect to a pixel of interest to be interpolated, the distance to a pixel to obtain a difference which is adjacent to the pixel of interest in a diagonal direction is larger than the distance to the pixel adjacent to the pixel of interest in a vertical direction.

Figures 11A, 11B, 11C, 11D, 11E:
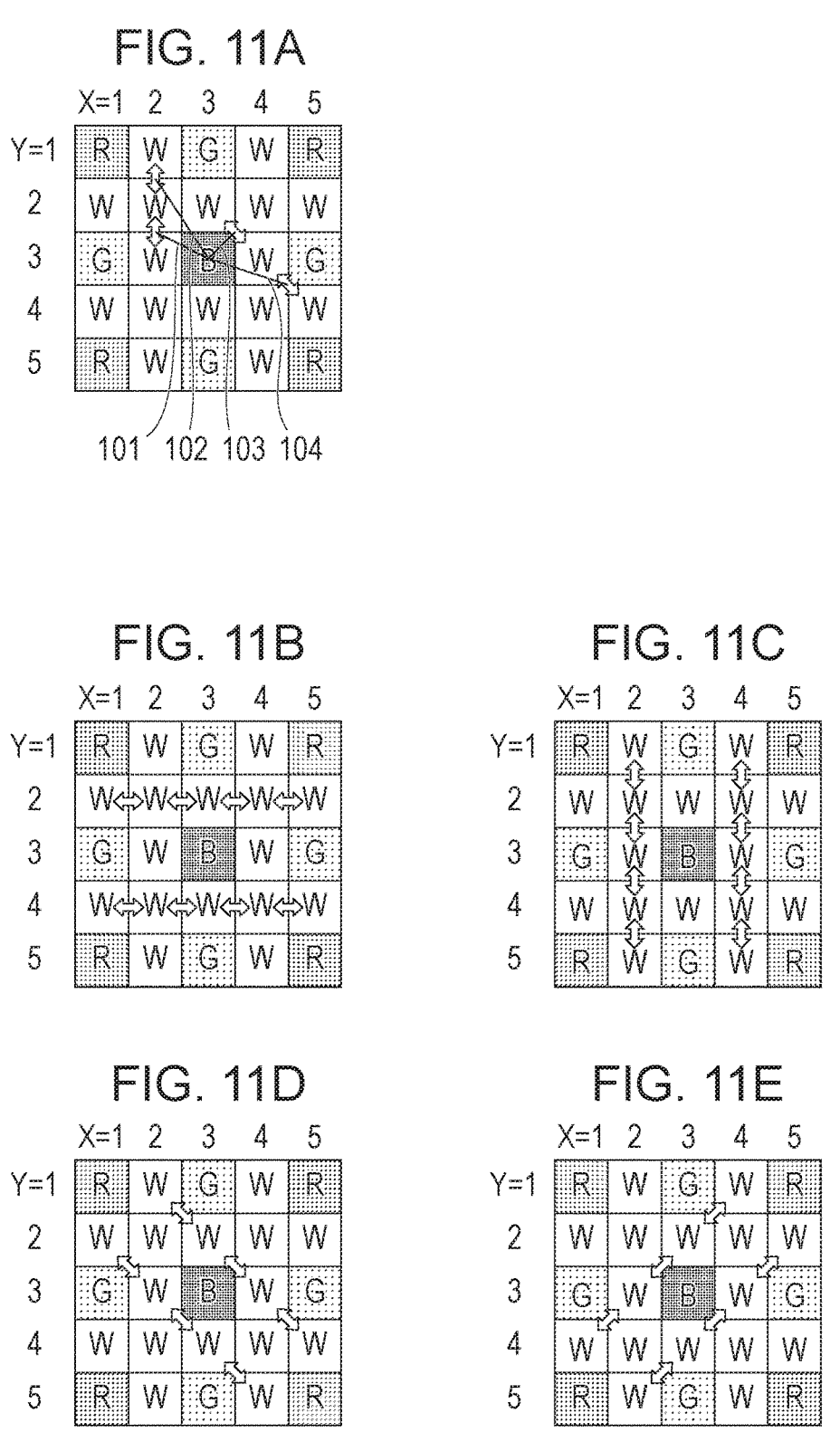

FIGS. 11A to 11E illustrate distances from a pixel of interest to the other pixel to acquire a difference. FIG. 11A illustrates a distance from a pixel of interest B(3, 3) to an adjacent pixel to obtain a difference for obtaining a correlation value about the pixel B(3, 3). Before calculating the distance, the distance from the center of gravity of the pixel of interest to the center of gravity of the other pixel to obtain a difference is defined as a single calculation distance with reference to the centers of gravity of the two pixels to obtain a difference. The term "center of gravity" refers to a position where the center of gravity of one microlens provided for one pixel is projected to a semiconductor substrate having the pixel, for example. Another example of the "center of gravity" may be the center of gravity of a photoelectric converting unit if a pixel has one photoelectric converting unit.

A single calculation distance 101 between a difference |W2, 2)–W2, 3)| in the vertical direction in FIG. 11A and B(3, 3) is equal to $\sqrt{15}$, where one pixel has a pitch of 2. A single calculation distance 202 between a difference |W(2, 1)–W(2, 2)| in the vertical direction in FIG. 11A and B(3, 3) is equal to $\sqrt{13}$, where one pixel has a pitch of 2. A single calculation distance 103 between the difference |W(3, 2)–W(4, 3)| in the diagonal direction in FIG. 11A and the B3, 3) is equal to $\sqrt{2}$, where one pixel has a pitch of 2. A single calculation distance 104 between the difference |W(4, 3)–W(5, 4)| in the diagonal direction in FIG. 11A and B(3, 3) is equal to $\sqrt{10}$, where one pixel has a pitch of 2.

The coefficients for the differences to calculate corresponding correlation values and the single calculation distances are multiplied, and the sum total thereof is defined as a calculation distance. For example, a calculation distance (vertical) in the vertical direction for acquiring the correlation value according to the first exemplary embodiment may be calculated as follows.

Calculation Distance (vertical)=$2\times\sqrt{5}+2\times\sqrt{5}+2\times\sqrt{5}+2\times\sqrt{5}=8\sqrt{5}$ In the same manner, calculating it for other directions, Calculation Distance (horizontal)=$8\sqrt{5}$ Calculation Distance (right diagonal)=$4\sqrt{2}+4\sqrt{10}$ Calculation Distance (left diagonal)=$4\sqrt{2}+4\sqrt{10}$ The vertical and horizontal calculation distance is equal to about 17.9, and the calculation distance in the diagonal direction is equal to about 18.3. The ratio is about 1.02 times.

The different calculation distances, that is, the different distances from the pixel of interest to a pixel to acquire a difference means that the distances for acquiring a spatial directivity are different. When the distances are different in the directions for acquiring correlation values, error may occur during detection of the directivity. Therefore, calculation distances as equal as possible may be desirable, and the ratio of the highest value and the lowest value of the calculation distance is preferably equal to or lower than 2.

According to this exemplary embodiment, the differences from adjacent pixels indicated by arrows in FIG. 11B, FIG. 11C, FIG. 11D, and FIG. 11E are acquired to obtain the correlation values. The correlation values may be obtained as follows.

Correlation Value (horizontal) =

$|W(1, 2) - W(2, 2)| + |W(2, 2) - W(3, 2)| \times 3 + |W(3, 2) - W(4, 2)| \times 3 +$ $|W(4, 2) - W(5, 2)| + |W(1, 4) - W(2, 4)| + |W(2, 4) - W(3, 4)| \times 3 +$ $|W(3, 4) - W(4, 4)| \times 3 + |W(4, 4) - W(5, 4)|$ Correlation Value (vertical) = $|W(2, 1) - W(2, 2)| +$ $|W(2, 2) - W(2, 3)| \times 3 + |W(2, 3) - W(2, 4)| \times 3 +$ $|W(2, 4) - W(2, 5)| + |W(4, 1) - W(4, 2)| + |W(4, 2) - W(4, 3)| \times 3 +$ $|W(4, 3) - W(4, 4)| \times 3 + |W(4, 4) - W(4, 5)|$ Correlation Value (left diagonal) =

$|W(1, 2) - W(2, 3)| \times 2 + |W(2, 3) - W(3, 4)| \times 2 +$ $|W(3, 4) - W(4, 5)| \times 2 + |W(2, 1) - W(3, 2)| \times 2 +$ $|W(3, 2) - W(4, 3)| \times 2 + |W(4, 3) - W(5, 4)| \times 2$ Correlation Value (right diagonal) =

$|W(1, 4) - W(2, 3)| \times 2 + |W(2, 3) - W(3, 2)| \times 2 +$ $|W(3, 2) - W(4, 1)| \times 2 + |W(2, 5) - W(3, 4)| \times 2 +$ $|W(3, 4) - W(4, 3)| \times 2 + |W(4, 3) - W(5, 2)| \times 2$ The respective calculation distances are as follows.

Calculation Distance (horizontal)=$4\sqrt{13}+12\sqrt{5}$

Calculation Distance (vertical)=$4\sqrt{13}+12\sqrt{5}$

Calculation Distance (left diagonal)=$8\sqrt{10}+4\sqrt{2}$

Calculation Distance (right diagonal)=$8\sqrt{10}+4\sqrt{2}$

The calculation distance in the vertical and horizontal directions is equal to about 41.26, and the calculation distance in the diagonal directions is equal to about 30.96. The ratio is about 1.33 times.

As a result of the comparison based on the method above, it has been found that the output data of this embodiment have 1050 TV horizontal resolutions or more, exhibiting a better resolution compared with the first exemplary embodiment.

Third Exemplary Embodiment

Figure 12:
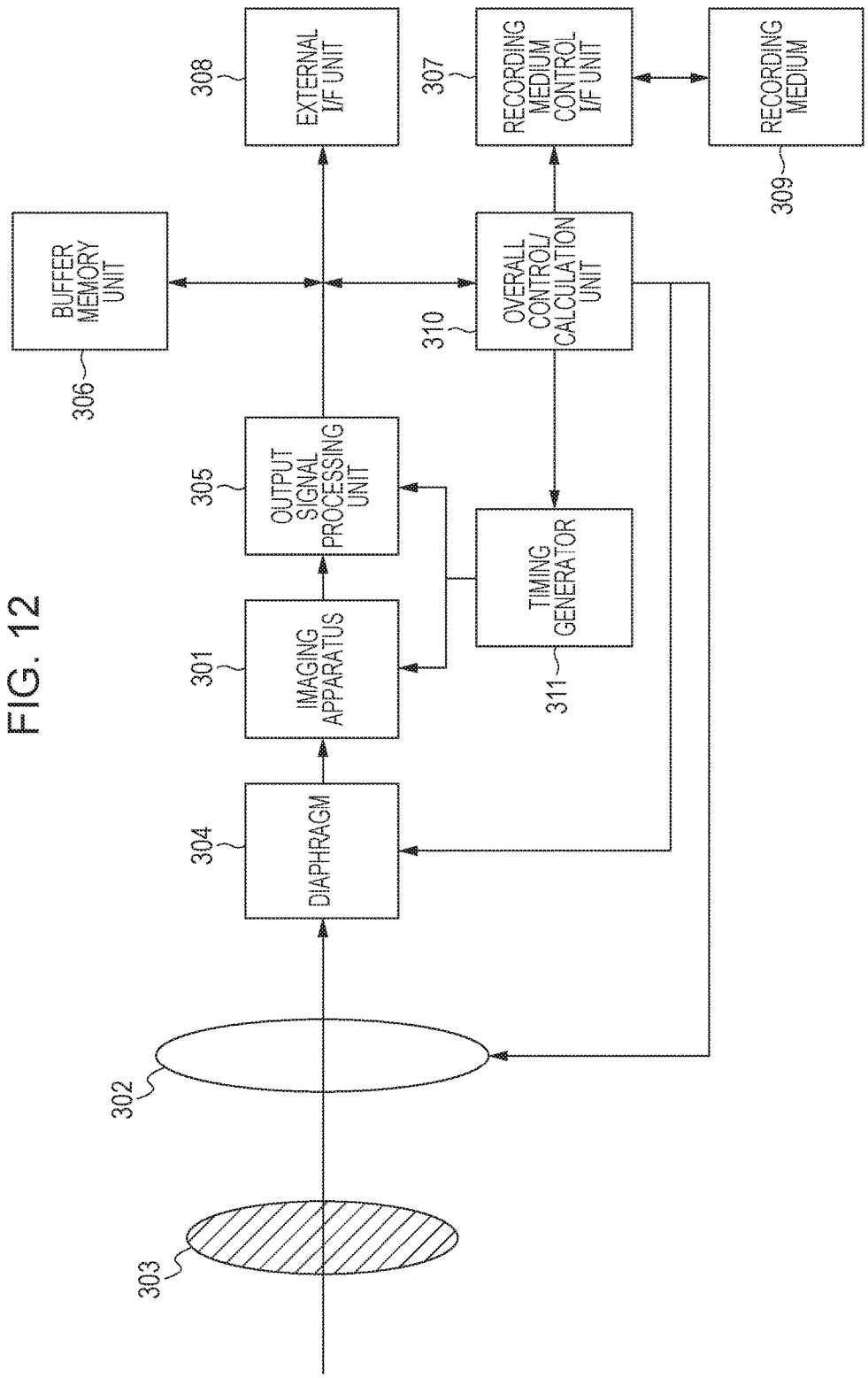
FIG. 12 illustrates a configuration of an imaging apparatus.

According to a third exemplary embodiment, an imaging system applying the imaging apparatus according to any one of the first and second exemplary embodiments will be described. The imaging system is an apparatus configured to capture an image and a moving picture by using the imaging apparatus and may be a digital still camera, digital camcorder, or a surveillance camera, for example. FIG. 12 illustrates a block diagram of an example of the imaging system applying an imaging apparatus according to any one of the first and second exemplary embodiments to a digital still camera.

Referring to FIG. 12, the imaging system has a lens 302 causing an optical image of a photographic subject to be focused in the imaging apparatus 301, and a diaphragm 304 usable for adjusting the amount of light passing through a barrier 303 and the lens 302 for protecting the lens 302. The imaging system further includes an output signal processing unit 305 configured to process an output signal output from the imaging apparatus 301. The output signal processing unit 305 has an image processing unit 203 according to any one of the first and second exemplary embodiments. The output signal processing unit 305 is provided on a semiconductor substrate different from a semiconductor substrate having the imaging apparatus 301 thereon.

The output signal processing unit 305 has a digital signal processing unit configured to perform a correction process and a compression process as required on a signal output from the imaging apparatus 301 and output a resulting signal.

The imaging system further includes a buffer memory unit 306 configured to temporarily store image data and a storage medium control interface (I/F) unit 307 usable for writing to or reading from a recording medium. The imaging system further has a recording medium 309 detachably mounted or built in the imaging system, such as a semiconductor memory, usable for writing or reading captured data. The imaging system further has an external interface (I/F) unit 308 usable for communication with an external computer, for example and an overall control/calculation unit 310 configured to control arithmetic operations and the whole digital still camera. The imaging system further has a timing generator 311 configured to output a timing signal to the output signal processing unit 305. A control signal such as a timing signal may be input externally, instead of the timing generator 311. In other words, the imaging system may include at least the imaging apparatus 301 and the output signal processing unit 305 configured to process an output signal output from the imaging apparatus 301.

As described above, the imaging system according to this exemplary embodiment is capable of performing imaging operations by applying the imaging apparatus 301 according to any one of the first and second exemplary embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
a first pixel, a second pixel, a third pixel, a fourth pixel, a fifth pixel, a sixth pixel, and a seventh pixel, each of the pixels having a photoelectric converting unit, and a signal processing unit,
wherein the first pixel is a pixel for receiving a light corresponding to any one of colors of green, blue, and red, on the photoelectric converting unit;
each of the second to seventh pixels is a pixel for receiving a light corresponding to white color on the photoelectric converting unit
the second to seventh pixels are adjacent to the first pixel;
the first pixel is present between the second pixel and the third pixel in a first direction;
the first pixel is present between the fourth pixel and the fifth pixel in a second direction different from the first direction;
the first pixel is present between the sixth pixel and the seventh pixel in a third direction different from the first and second directions;
the fourth pixel and the seventh pixel are provided adjacently along a direction parallel with the first direction;
the second pixel and the sixth pixel are provided adjacently along a direction parallel with the second direction;
the signal processing unit acquires a first correlation value being a correlation value in the first direction from signals of the fourth pixel and the seventh pixel and acquires a second correlation value being a correlation value in the second direction from signals of the second pixel and the sixth pixel;
the signal processing unit acquires one with higher correlation between the first direction and the second direction by comparing the first correlation value and the second correlation value; and
the signal processing unit further interpolates a signal corresponding to a light of white color at a position of the first pixel by using signals of two pixels provided along the direction with higher correlation among the second to seventh pixels.

2. An imaging apparatus comprising:
a first pixel, a second pixel, a third pixel, a fourth pixel, a fifth pixel, a sixth pixel, and a seventh pixel, each of the pixels having a photoelectric converting unit, and a signal processing unit,
wherein the first pixel is a pixel for receiving a light corresponding to any one of colors of cyan, yellow, and magenta, on the photoelectric converting unit;
each of the second to seventh pixels is a pixel for receiving a light corresponding to white color on the photoelectric converting unit;
the second to seventh pixels are adjacent to the first pixel;
the first pixel is present between the second pixel and the third pixel in a first direction;
the first pixel is present between the fourth pixel and the fifth pixel in a second direction different from the first direction;
the first pixel is present between the sixth pixel and the seventh pixel in a third direction different from the first and second directions;

the fourth pixel and the seventh pixel are provided adjacently along a direction parallel with the first direction;
the second pixel and the sixth pixel are provided adjacently along a direction parallel with the second direction;
the signal processing unit acquires a first correlation value being a correlation value in the first direction from signals of the fourth pixel and the seventh pixel and acquires a second correlation value being a correlation value in the second direction from signals of the second pixel and the sixth pixel;
the signal processing unit acquires one with higher correlation between the first direction and the second direction by comparing the first correlation value and the second correlation value; and
the signal processing unit further interpolates a signal corresponding to a light of white color at a position of the first pixel by using signals of two pixels provided along the direction with higher correlation among the second to seventh pixels.

3. The imaging apparatus according to claim 1,
wherein the first pixel is further adjacent to eighth and ninth pixels each having a photoelectric converting unit and receiving a light corresponding to white color on the photoelectric converting unit, and the first pixel is present between the eighth pixel and the ninth pixel in a fourth direction different from the first, second and third directions;
the eighth pixel, the fourth pixel, and the seventh pixel are provided adjacently in a direction parallel with the first direction;
the sixth pixel, the fifth pixel, and the ninth pixel are provided adjacently along a direction parallel with the first direction;
the eighth pixel, the second pixel, and the sixth pixel are provided adjacently along a direction parallel with the second direction; and
the seventh pixel, the third pixel, and the ninth pixel are provided adjacently in a direction parallel with the second direction.

4. The imaging apparatus according to claim 2,
wherein the first pixel is further adjacent to eighth and ninth pixels each having a photoelectric converting unit and receiving a light corresponding to white color on the photoelectric converting unit, and the first pixel is present between the eighth pixel and the ninth pixel in a fourth direction different from the first, second and third directions;
the eighth pixel, the fourth pixel, and the seventh pixel are provided adjacently in a direction parallel with the first direction;
the sixth pixel, the fifth pixel, and the ninth pixel are provided adjacently along a direction parallel with the first direction;
the eighth pixel, the second pixel, and the sixth pixel are provided adjacently along a direction parallel with the second direction; and
the seventh pixel, the third pixel, and the ninth pixel are provided adjacently in a direction parallel with the second direction.

5. The imaging apparatus according to claim 3,
wherein the signal processing unit acquires
the first correlation value by using signals of the eighth pixel, the fourth pixel, and the seventh pixel;
the second correlation value by using signals of the eighth pixel, the second pixel, and the sixth pixel;
a third correlation value being a correlation value in the third direction by using signals of the second pixel and the fourth pixel; and
a fourth correlation value being a correlation value in the fourth direction by using signals of the second pixel and the fifth pixel; and
the signal processing unit acquires a direction with a highest correlation among the first, second, third, and fourth directions by comparing the first, second, third, and fourth correlation values and interpolates a signal corresponding a light of white color at a position of the first pixel by using signals of two pixels provided along the direction with the highest correlation among the second to ninth pixels.

6. The imaging apparatus according to claim 5, wherein the signal processing unit acquires the first, second, third, and fourth correlation values by weighting based on a distance between a center of gravity of the first pixel and a center of gravity of the second pixel.

7. An imaging system comprising:
an imaging apparatus; and
an image processing unit generating an image by using a signal output from the imaging apparatus,
wherein the imaging apparatus is an imaging apparatus including
a first pixel, a second pixel, a third pixel, a fourth pixel, a fifth pixel, a sixth pixel, and a seventh pixel, each of the pixels having a photoelectric converting unit, and a signal processing unit,
wherein the first pixel is a pixel for receiving a light corresponding to any one of colors of green, blue, and red, on the photoelectric converting unit;
each of the second to seventh pixels is a pixel for receiving a light corresponding to white color on the photoelectric converting unit;
the second to seventh pixels are adjacent to the first pixel;
the first pixel is present between the second pixel and the third pixel in a first direction;
the first pixel is present between the fourth pixel and the fifth pixel in a second direction different from the first direction;
the first pixel is present between the sixth pixel and the seventh pixel in a third direction different from the first and second directions;
the fourth pixel and the seventh pixel are provided adjacently along a direction parallel with the first direction;
the second pixel and the sixth pixel are provided adjacently along a direction parallel with the second direction;
the signal processing unit acquires a first correlation value being a correlation value in the first direction from signals of the fourth pixel and the seventh pixel and acquires a second correlation value being a correlation value in the second direction from signals of the second pixel and the sixth pixel;
the signal processing unit acquires one with higher correlation between the first direction and the second direction by comparing the first correlation value and the second correlation value; and
the signal processing unit further interpolates a signal corresponding to a light of white color at a position of the first pixel by using signals of two pixels provided along the direction with higher correlation among the second to seventh pixels.

8. An imaging system comprising:
an imaging apparatus; and an image processing unit configured to generate an image by using a signal output from the imaging apparatus, wherein the imaging apparatus is an imaging apparatus including a first pixel, a second pixel, a third pixel, a fourth pixel, a fifth pixel, a sixth pixel, and a seventh pixel, each of the pixels having a photoelectric converting unit, and a signal processing unit, wherein the first pixel is a pixel for receiving a light corresponding to any one of colors of cyan, yellow, and magenta on the photoelectric converting unit;

each of the second to seventh pixels is a pixel for receiving a light corresponding to white color on the photoelectric converting unit;

the second to seventh pixels are adjacent to the first pixel;

the first pixel is present between the second pixel and the third pixel in a first direction;

the first pixel is present between the fourth pixel and the fifth pixel in a second direction different from the first direction;

the first pixel is present between the sixth pixel and the seventh pixel in a third direction different from the first and second directions;

the fourth pixel and the seventh pixel are provided adjacently along a direction parallel with the first direction;

the second pixel and the sixth pixel are provided adjacently along a direction parallel with the second direction;

the signal processing unit acquires a first correlation value being a correlation value in the first direction from signals of the fourth pixel and the seventh pixel and acquires a second correlation value being a correlation value in the second direction from signals of the second pixel and the sixth pixel;

the signal processing unit acquires one with higher correlation between the first direction and the second direction by comparing the first correlation value and the second correlation value; and the signal processing unit further interpolates a signal corresponding to a light of white color at a position of the first pixel by using signals of two pixels provided along the direction with higher correlation among the second to seventh pixels.

9. A signal processing method for processing signals output from a first pixel, a second pixel, a third pixel, a fourth pixel, a fifth pixel, a sixth pixel, and a seventh pixel, each of the pixels having a photoelectric converting unit, in which the first pixel is a pixel for receiving a light corresponding to any one of colors of green, blue, and red, on the photoelectric converting unit;

each of the second to seventh pixels is a pixel for receiving a light corresponding to white color on the photoelectric converting unit;

the second to seventh pixels are adjacent to the first pixel;

the first pixel is present between the second pixel and the third pixel in a first direction;

the first pixel is present between the fourth pixel and the fifth pixel in a second direction different from the first direction;

the first pixel is present between the sixth pixel and the seventh pixel in a third direction different from the first and second directions;

the fourth pixel and the seventh pixel are provided adjacently along a direction parallel with the first direction;

the second pixel and the sixth pixel are provided adjacently along a direction parallel with the second direction;

the signal processing method comprising:

acquiring a first correlation value being a correlation value in the first direction from signals of the fourth pixel and the seventh pixel and acquiring a second correlation value being a correlation value in the second direction from signals of the second pixel and the sixth pixel;

acquiring one with higher correlation between the first direction and the second direction by comparing the first correlation value and the second correlation value; and interpolating a signal corresponding to a light of white color at a position of the first pixel by using signals of two pixels provided along the direction with higher correlation among the second to seventh pixels.

* * * * *